US012750842B2

(12) United States Patent
Hosseini et al.

(10) Patent No.: US 12,750,842 B2
(45) Date of Patent: Sep. 29, 2026

(54) MITIGATING THE IMPACTS OF NARROWBAND SPUR FIELD OF THE DISCLOSURE

(71) Applicant: QUALCOMM Incorporated, San Diego, CA (US)

(72) Inventors: Kianoush Hosseini, San Diego, CA (US); Jing Jiang, San Diego, CA (US); Yonghee Han, San Diego, CA (US); Jae Won Yoo, San Diego, CA (US); Vinayak Suresh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 407 days.

(21) Appl. No.: 18/185,256

(22) Filed: Mar. 16, 2023

(65) Prior Publication Data

US 2024/0314765 A1 Sep. 19, 2024

(51) Int. Cl.
*H04W 72/1263* (2023.01)
*H04L 1/00* (2006.01)
*H04W 72/23* (2023.01)
*H04W 72/51* (2023.01)

(52) U.S. Cl.
CPC ....... *H04W 72/1263* (2013.01); *H04L 1/0003* (2013.01); *H04W 72/23* (2023.01); *H04W 72/51* (2023.01)

(58) Field of Classification Search
CPC . H04W 72/1263; H04W 72/23; H04W 72/51; H04W 72/0453; H04W 72/541; H04L 1/0003; H04L 5/0001; H04L 5/0094
USPC .................................................. 370/329–330
See application file for complete search history.

(56) References Cited

U.S. PATENT DOCUMENTS

2014/0254509 A1* 9/2014 Chen ..................... H04L 5/0058 370/329
2016/0135194 A1* 5/2016 Kim ...................... H04L 1/0003 370/329
2018/0027527 A1* 1/2018 Vitthaladevuni .... H04B 7/0413 370/330
2018/0069612 A1* 3/2018 Yum ..................... H04L 5/0091
2022/0070891 A1 3/2022 Nam et al.
2022/0217736 A1* 7/2022 Taherzadeh Boroujeni ................ H04W 72/1263

FOREIGN PATENT DOCUMENTS

WO WO-2022146555 A1 7/2022

OTHER PUBLICATIONS

International Search Report and Written Opinion—PCT/US2024/016915—ISA/EPO—Jun. 25, 2024 (2203767WO).

* cited by examiner

*Primary Examiner* — Candal Elpenord
(74) *Attorney, Agent, or Firm* — Norton Rose Fulbright US LLP

(57) ABSTRACT

Methods, systems, and devices for wireless communications are described. A scheduled entity transmits an indication of frequency resources that have different transmission requirements from those of other frequency resources in a smallest frequency domain scheduling unit that comprises the frequency resources for the scheduled entity. The scheduled entity receives, from a scheduling entity, signaling indicating at least one characteristic of how a channel is to be scheduled on the frequency resources from a scheduling entity. The scheduled entity communicates with the scheduling entity in accordance with the at least one characteristic.

31 Claims, 10 Drawing Sheets

MITIGATING THE IMPACTS OF NARROWBAND SPUR FIELD OF THE DISCLOSURE

FIELD OF THE DISCLOSURE

Aspects of the present disclosure generally relate to wireless communication and to techniques and apparatuses for mitigating the impact of at least one spur.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a scheduled entity is provided, the method comprising: transmitting an indication of frequency resources that have different transmission requirements from those of other frequency resources in a smallest frequency domain scheduling unit comprising the frequency resources for the scheduled entity; receiving, from a scheduling entity, signaling indicating at least one characteristic of how a channel is to be scheduled on the frequency resources; and communicating with the scheduling entity in accordance with the at least one characteristic.

In some aspects, the smallest frequency domain scheduling unit is a resource block (RB). The frequency resources may be indicated at a subcarrier or other sub-RB level of granularity. The indication of frequency resources may comprise an indication of frequency resources per a bandwidth part (BWP), a component carrier (CC), a band or a transmission direction between the scheduled entity and the scheduling entity.

In some aspects, the indication of frequency resources is transmitted: during an initial access operation to a base station, wherein the base station is the scheduling entity; as part of a capability report of the scheduled entity; periodically; or when triggered by an event.

In some aspects, the event is one of: receiving a request from the scheduling entity to indicate frequency resources that have different transmission requirements from those of other frequency resources in a smallest frequency domain scheduling unit comprising the frequency resources; detecting, by the scheduled entity, that at least one location of subcarriers that have different transmission requirements from those of other frequency resources in a smallest frequency domain scheduling unit comprising the frequency resources has changed; a change in an operating frequency for communication between the scheduling entity and scheduled entity; addition or removal of a cell in carrier aggregation or dual connectivity; or a change in communication direction between the scheduling entity and scheduled entity.

In some aspects, the method may further comprise: receiving a scheduling assignment for resources including the frequency resources, wherein the scheduling assignment indicates a nominal modulation order, coding scheme, coding rate, or modulation and coding scheme (MCS); and communicating on the frequency resources using a modulation order, coding scheme, coding rate, or MCS different from the nominal modulation order, coding scheme, coding rate, or MCS based on the at least one characteristic of how a channel is to be scheduled on the frequency resources.

In some aspects, the at least one characteristic comprises one of a number of scheduling options, the scheduling options being: using a lower order modulation order, more reliable coding scheme, lower coding rate or combination thereof for at least a subset of frequency resources of the frequency resources than other frequency resources in a scheduling assignment; using a more reliable modulation and coding scheme (MCS) for frequency resources of the impacted frequency resources than other frequency resources in a scheduling assignment; or not using at least a subset of frequency resources of the frequency resources for communication.

In those aspects, for frequency resources other than the frequency resources, least significant bits of modulation symbols to be modulated on the frequency resources may be encoded using a more reliable coding scheme than most significant bits of the modulation symbols, wherein the more reliable coding scheme for the frequency resources comprises using a coding scheme that is at least as reliable as the coding scheme used for the least significant bits. The at least a subset of frequency resources of the frequency resources may comprise a plurality of subsets of the frequency resources and each of the plurality of subsets uses one of the scheduling options and the signaling indicating at least one characteristic of how the channel is to be scheduled on the frequency resources may indicate the plurality of subsets of the frequency resources and the corresponding scheduling options.

In some aspects, the signaling indicating at least one characteristic of how the channel is to be scheduled on the frequency resources indicates time resources in which the at least one characteristic is to be used. The at least one characteristic may comprise a scheduling option that at least a subset of frequency resources of the frequency resources are not used for communication and the time resources are a subset of slots in a scheduling assignment.

In some aspects, the signaling indicating at least one characteristic of how the channel is to be scheduled on the frequency resources comprises: radio resource control (RRC) signaling defining one or more rules relating a modulation order, coding scheme, coding rate, modulation and coding scheme (MCS) or decision not to use specific frequency resources for at least a subset of the frequency resources to a nominal modulation order, coding scheme, coding rate or MCS of a scheduling assignment; or downlink control information (DCI) of a scheduling grant.

In some aspects, the frequency resources may be impacted by a radio frequency impairment or a spur. The method may further comprise transmitting assistance information or a capability report indicating a spur cancelation capability or request of the scheduled entity. Further, the spur cancellation capability or request may comprises a mapping between nominal modulation orders, coding schemes, coding rates, or modulation and coding scheme (MCS) of a scheduling assignment and respective modulation orders, coding scheme, coding rate, MCS or decision not to use specific frequency resources.

In some aspects, the frequency resources carry reference signals and the at least one characteristic comprises: shifting a reference signal pattern by a number of subcarriers within a resource block (RB) so that resource elements of the reference signals do not overlap with the frequency resources; an adjusted reference signal pattern different from a nominal reference signal pattern of a scheduling assignment, wherein resource elements of the adjusted reference signal pattern do not overlap with the frequency resources; or not using resource elements of the reference signals for channel estimation. When the number of resource elements of the reference signals that are not used for channel estimation is greater than a threshold, a RB or group of RBs comprising the resource elements of the reference signals may not be used for data transmission.

In another aspect, a method of wireless communication performed by a scheduling entity is provided, the method comprising: receiving, from a scheduled entity, an indication of frequency resources that have different transmission requirements from those of other frequency resources in a smallest frequency domain scheduling unit comprising the frequency resources at the scheduled entity; determining, based on the indication, at least one characteristic of how a channel is to be scheduled on the frequency resources; transmitting, to the scheduled entity, signaling indicating the at least one characteristic; and communicating with the scheduling entity in accordance with the at least one characteristic.

In some aspects, the smallest frequency domain scheduling unit is a resource block (RB). The frequency resources may be indicated at a subcarrier or other sub-RB level of granularity. The indication of frequency resources may comprise an indication of frequency resources per a bandwidth part (BWP), a component carrier (CC), a band or a transmission direction between the scheduled entity and the scheduling entity.

In some aspects, the at least one characteristic comprises one of a number of scheduling options, the scheduling options being: using a lower order modulation order, more reliable coding scheme, lower coding rate or combination thereof for at least a subset of frequency resources of the frequency resources than other frequency resources in a scheduling assignment; using a more reliable modulation and coding scheme (MCS) for frequency resources of the impacted frequency resources than other frequency resources in a scheduling assignment; or not using at least a subset of frequency resources of the frequency resources for communication.

In those aspects, for frequency resources other than the frequency resources, least significant bits of modulation symbols to be modulated on the frequency resources may be encoded using a more reliable coding scheme than most significant bits of the modulation symbols, wherein the more reliable coding scheme for the frequency resources comprises using a coding scheme that is at least as reliable as the coding scheme used for the least significant bits. The at least a subset of frequency resources of the frequency resources may comprise a plurality of subsets of the frequency resources and each of the plurality of subsets uses one of the scheduling options and the signaling indicating at least one characteristic of how the channel is to be scheduled on the frequency resources may indicate the plurality of subsets of the frequency resources and the corresponding scheduling options.

In some aspects, the signaling indicating at least one characteristic of how the channel is to be scheduled on the frequency resources indicates time resources in which the at least one characteristic is to be used. The at least one characteristic may comprise a scheduling option that at least a subset of frequency resources of the frequency resources are not used for communication and the time resources are a subset of slots in a scheduling assignment.

In some aspects, the signaling indicating at least one characteristic of how the channel is to be scheduled on the frequency resources comprises: radio resource control (RRC) signaling defining one or more rules relating a modulation order, coding scheme, coding rate, modulation and coding scheme (MCS) or decision not to use specific frequency resources for at least a subset of the frequency resources to a nominal modulation order, coding scheme, coding rate or MCS of a scheduling assignment; or downlink control information (DCI) of a scheduling grant.

In some aspects, the method may further comprise receiving assistance information indicating a spur cancellation capability of the scheduled entity, wherein the determining at least one characteristic of how the channel is to be scheduled on the frequency resources is based on the spur cancellation capability.

In some aspects, the frequency resources carry reference signals and the at least one characteristic comprises: shifting a reference signal pattern by a number of subcarriers within a resource block (RB) so that resource elements of the reference signals do not overlap with the frequency resources; an adjusted reference signal pattern different from a nominal reference signal pattern of a scheduling assignment, wherein resource elements of the adjusted reference signal pattern do not overlap with the frequency resources;

or not using resource elements of the reference signals for channel estimation. When the number of resource elements of the reference signals that are not used for channel estimation is greater than a threshold, a RB or group of RBs comprising the resource elements of the reference signals may not be used for data transmission.

In another aspect, an apparatus for wireless communication by a scheduled entity, the apparatus comprising: a memory; and at least one processor operatively coupled to the memory. The memory and the one or more processors are configured to cause the scheduled entity to: transmit an indication of frequency resources that have different transmission requirements from those of other frequency resources in a smallest frequency domain scheduling unit comprising the frequency resources for the scheduled entity; receive, from a scheduling entity, signaling indicating at least one characteristic of how a channel is to be scheduled on the frequency resources; and communicate with the scheduling entity in accordance with the at least one characteristic.

In another aspect, an apparatus for wireless communication by a scheduling entity is provided, the apparatus comprising: a memory; and at least one processor operatively coupled to the memory. The memory and the one or more processors are configured to cause the scheduling entity to: receive, from a scheduled entity, an indication of frequency resources that have different transmission requirements from those of other frequency resources in a smallest frequency domain scheduling unit comprising the frequency resources the scheduled entity; determine, based on the indication, at least one characteristic of how a channel is to be scheduled on the frequency resources; transmit, to the scheduled entity, signaling indicating the at least one characteristic; and communicate with the scheduling entity in accordance with the at least one characteristic.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Figure 1:
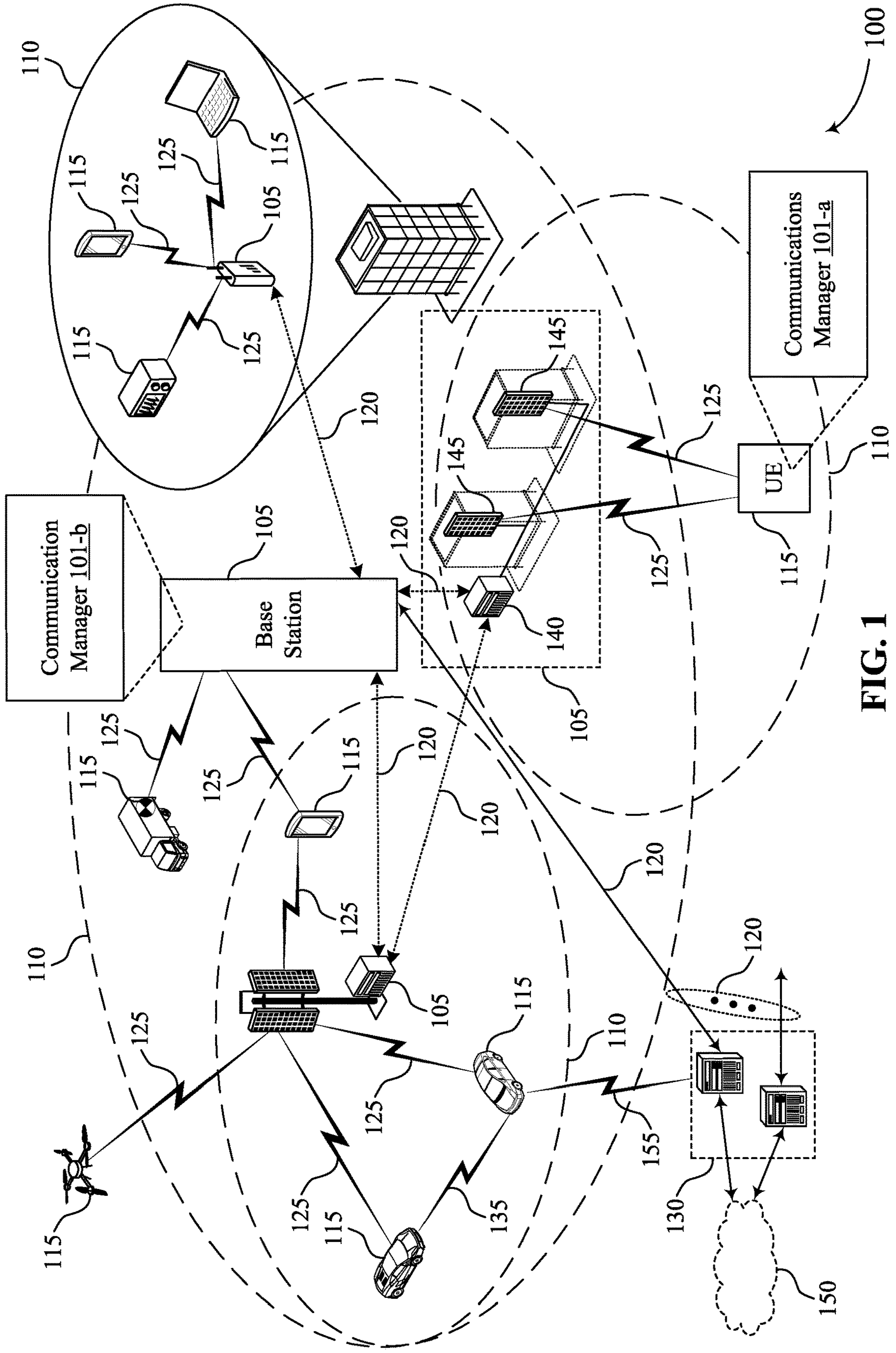
FIG. 1 illustrates an example of a wireless communications system that supports mitigating the impact of at least one spur in accordance with one or more aspects of the present disclosure.

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

In wireless communication systems, signals to be transmitted between a transmitter and receiver may be corrupted in any number of ways. For example, a signal may be degraded in the wireless communication channel by noise, interference from other signals, and attenuation. Other sources of corruption are due to imperfections in the transmit and receive chains at the transmitter and receiver themselves.

A spurious response, also known as a spur, is an undesired signal at a specific frequency or tone and generated within a wireless device. The components of the transmit and receive chains can produce spurs in certain frequencies to cause inaccurate decoding at the receiver, resulting in degradation of communication performance. In many scenarios, the magnitude and phase of a spur can be estimated and be used to compensate for its impact. However, in some scenarios such estimation may not be possible, and in others, even if it is possible, it may require excessive time to ensure accurate results. For example, the UE may receive waveforms over several slots before the estimation converges and during this time the resources will continue to be affected by the spur. As a result, the impact of a spur may not be able to be fully compensated. Any residual spur could still degrade the estimation of modulated symbols, thereby reducing the achievable throughput.

Spurs typically impact fixed locations in frequency. If the locations of the spurs caused by the transmit and/or receive chains of a scheduled entity are known by the scheduling entity, the scheduling entity can adjust how modulated symbols are transmitted in such locations so that they are better protected. This application discloses methods, apparatuses and devices for conveying frequency locations impacted by spurs at a scheduled entity to a scheduling entity and possible ways that a scheduling entity can leverage such information to improve performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

One or more aspects of the disclosure are initially described in the context of wireless communications systems. One or more aspects of the disclosure are further illustrated by and described with reference to process flows, apparatus diagrams, system diagrams, and flowcharts that relate to distortion probing reference signals.

FIG. 1 illustrates an example of a wireless communications system 100 that supports distortion probing reference signals in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, a UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing (SCS). Each slot may include a number of symbol periods (e.g., depending on the length of the cyclic prefix prepended to each symbol period). In some wireless communications systems 100, a slot may further be divided into multiple subslots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a sub-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In various examples, a communication manager 101 may be included in a device to support DMRS combining across slots or subslots. For example, a UE 115 may include a communications manager 101-*a*, or a base station may include a communications manager 101-*b*.

Figure 2:
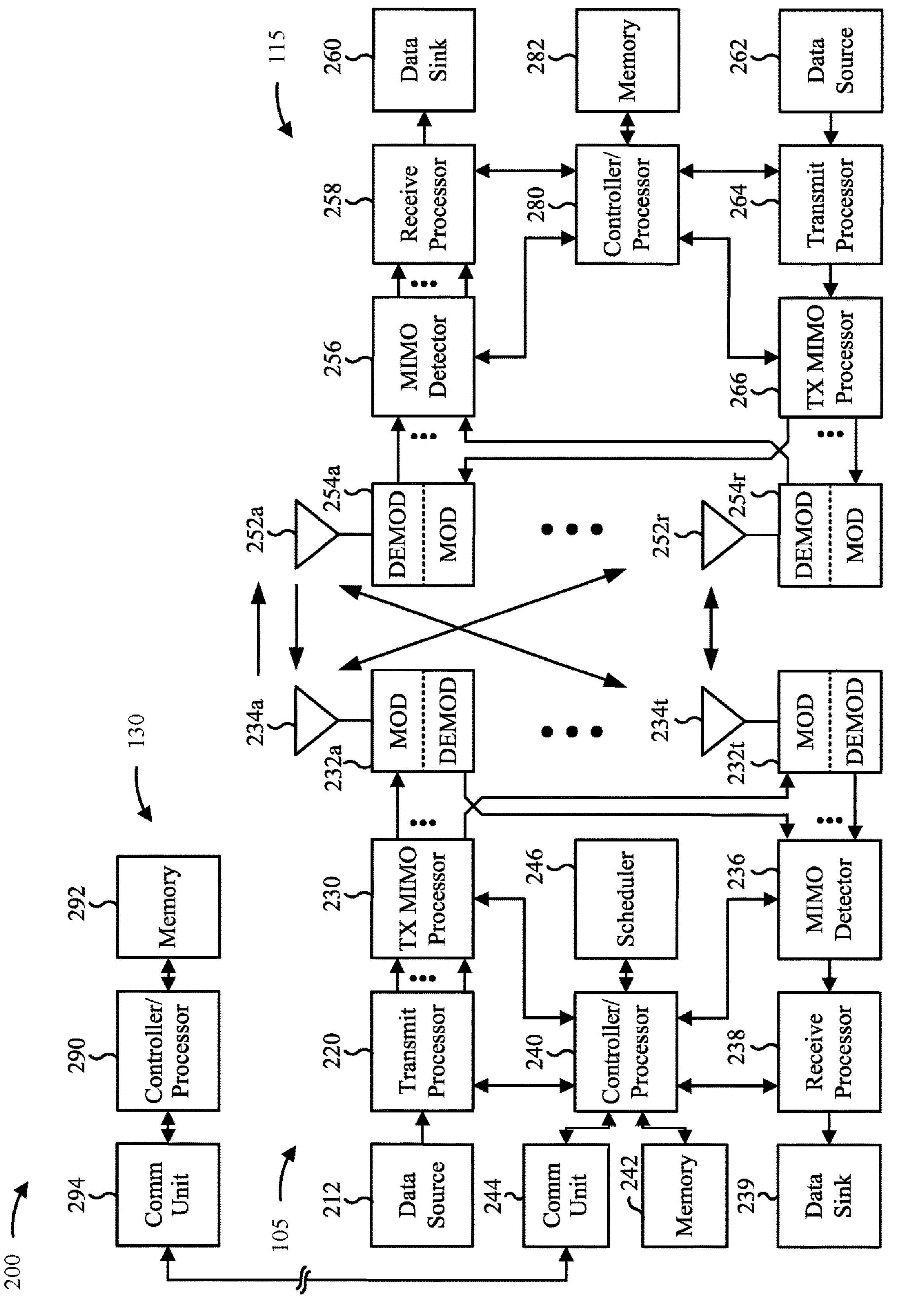
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 105 may be equipped with T antennas 234*a* through 234*t*, and UE 115 may be equipped with R antennas 252*a* through 252*r*, where in general T≥1 and R≥1.

At base station 105, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other possibilities/examples) and control information (for example, CQI requests, grants, upper layer signaling, among other possibilities/examples) and provide overhead symbols and control symbols. Transmit processor 220 may also generate reference symbols for reference signals (for example, demodulation reference signals (DMRSs)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other possibilities/examples) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 115, antennas 252*a* through 252*r* may receive the downlink signals from base station 105 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM among other possibilities/examples) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 115 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), among other possibilities/examples. In some aspects, one or more components of UE 115 may be included in a housing.

On the uplink, at UE 115, a transmit processor 264 may receive and process data from a data source 262 as well as control information (for example, for reports including RSRP, RSSI, RSRQ, CQI, among other possibilities/examples) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM), among other possibilities/examples), and transmitted to base station 105. At base station 105, the uplink signals from UE 115 and other UEs may be received by antennas 234, processed by DEMODs 232, detected by a MIMO detector 236 if applicable, and further processed by a receive processor 238 to obtain decoded data and control information sent by UE 115. Receive processor 238 may provide the decoded data to a data sink 239 and the decoded control information to controller/processor 240. Base station 105 may include communication unit 244 and communicate to network controller 270 via communication unit 244. Network controller 270 may include communication unit 294, controller/processor 290, and memory 292.

Controller/processor 240 of base station 105, controller/processor 280 of UE 115, or any other component(s) of FIG. 2 may perform one or more techniques associated with DMRS bundling, as described in more detail elsewhere herein. For example, controller/processor 240 of base station 105, controller/processor 280 of UE 115, or any other component(s) of FIG. 2 may perform or direct operations of, for example, process 700 of FIG. 7, process 800 of FIG. 8, or other processes as described herein. Memories 242 and 282 may store data and program codes for base station 105 and UE 115, respectively. A scheduler 246 may schedule UEs for data transmission on the downlink or uplink.

In some aspects, a scheduled entity (such as UE 115) may include means for transmitting an indication of frequency resources impacted by a spur at the scheduled entity, means for receiving, from a scheduling entity, signaling indicating at least one characteristic of how traffic is to be scheduled on the impacted frequency resources, means for communicating with the scheduling entity in accordance with the at least one characteristic, among other possibilities/examples. In some aspects, such means may include one or more components of BS 105 or UE 115 described in connection with FIG. 2.

In some aspects, a scheduling entity (such as BS 105 or UE 115) may include means for receiving, from a scheduled entity, an indication of frequency resources impacted by a spur at the scheduled entity, means for determining, based on the indication, at least one characteristic of how traffic is to be scheduled on the impacted frequency resources, means for transmitting, to the scheduled entity, signaling indicating the at least one characteristic, and means for communicating with the scheduling entity in accordance with the at least one characteristic, among other possibilities/examples. In some aspects, such means may include one or more components of BS 105 or UE 115 described in connection with FIG. 2.

Figure 3:
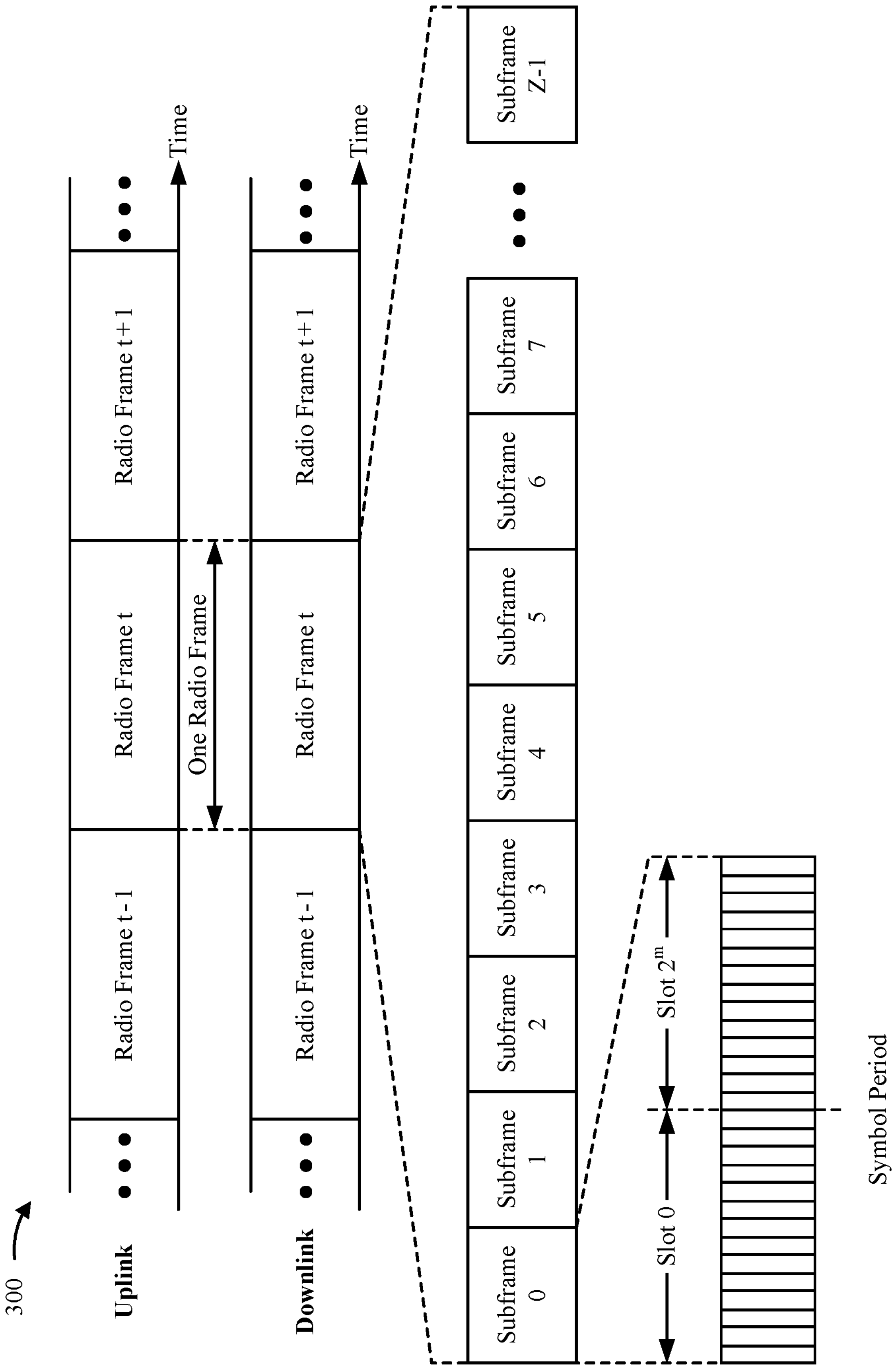
FIG. 3 is a block diagram illustrating an example frame structure for use in a wireless network in accordance with various aspects of the present disclosure.

FIG. 3 is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z ($Z \geq 1$) subframes (for example, with indices of 0 through $Z-1$). Each subframe may have a predetermined duration (for example, 1 ms) and may include a set of slots. For example, in a NR system there may be $2^m$ slots per subframe are shown in FIG. 3, where m is the numerology used for a transmission, such as 0, 1, 2, 3, 4. The numerology may be related to the subcarrier spacing, $\Delta f$, according to $\Delta f = 2^m \cdot 15$ kHz. Each slot may include a set of L symbol periods. For example, each slot may include fourteen symbol periods (for example, as shown in FIG. 3), seven symbol periods, or another quantity of symbol periods. In a case where the subframe includes two slots (for example, when $m=1$), the subframe may include 2L symbol periods, where the 2L symbol periods in each subframe may be assigned indices of 0 through $2L-1$. In some aspects, a scheduling unit for the FDD may be frame-based, subframe-based, slot-based, symbol-based, among other possibilities/examples.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3 may be used.

Figure 4:
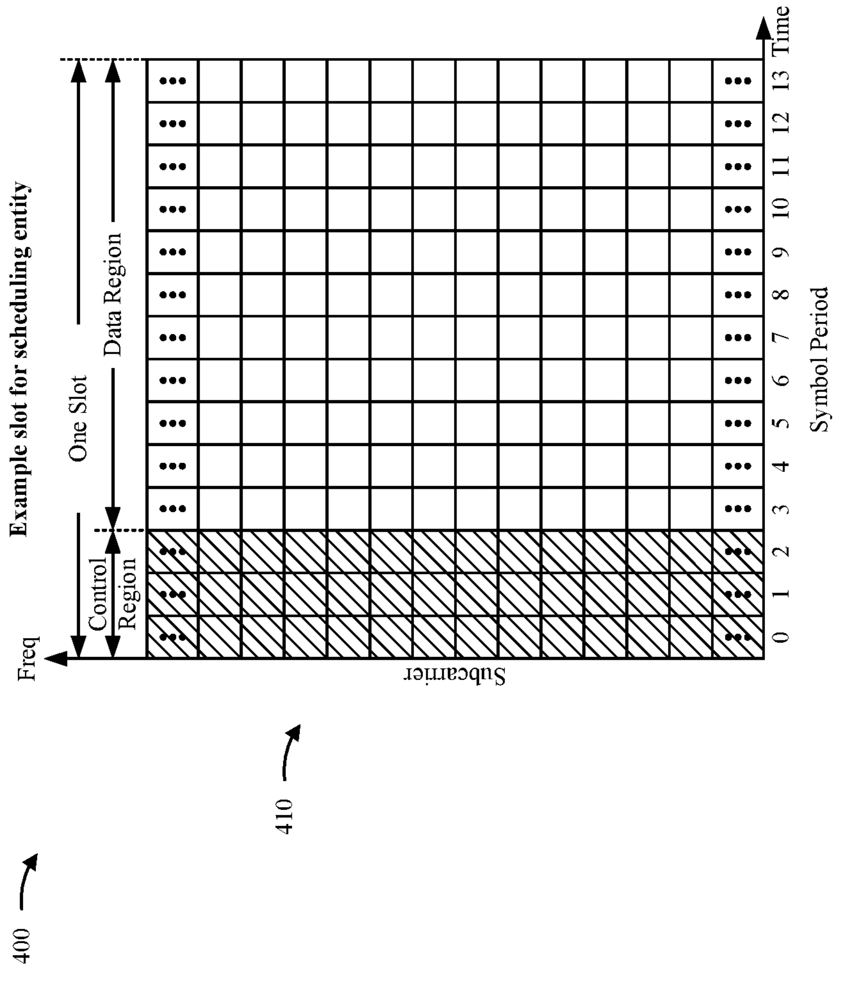
FIG. 4 is a block diagram illustrating an example slot format in accordance with various aspects of the present disclosure.

FIG. 4 is a block diagram 400 illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through $Q-1$ may be defined, where Q may be equal to 4, 6, 8, 10, or some other value. Each interlace may include slots that are spaced apart by Q frames. In particular, interlace q may include slots q, $q+Q$, $q+2Q$, etc., where $q \in \{0, \ldots, Q-1\}$.

Figure 5:
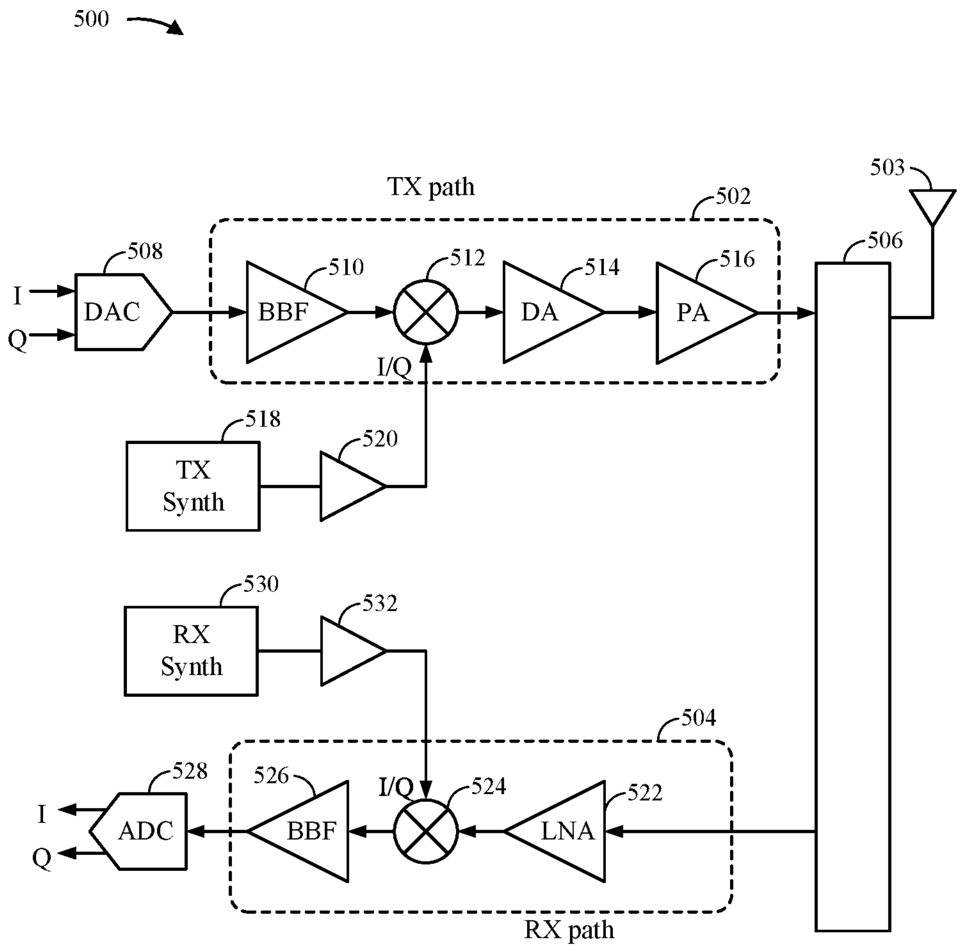
FIG. 5 is a block diagram of an example transceiver front end, in accordance with certain aspects of the present disclosure.

FIG. 5 is a block diagram of an example transceiver front end 500 of a wireless communication device, in which aspects of the present disclosure may be practiced. The transceiver front end 500 includes a transmit (TX) chain 502 (also known as a transmit path) for transmitting signals via one or more antennas and a receive (RX) chain 504 (also known as a receive path) for receiving signals via the antennas. When the TX chain 502 and the RX chain 504 share an antenna 503, the paths may be connected with the antenna via an interface 506, which may include any of various suitable RF devices, such as a duplexer, a switch, a diplexer, and the like.

Receiving in-phase (I) or quadrature (Q) baseband analog signals from a digital-to-analog converter (DAC) 508, the TX chain 502 may include a baseband filter (BBF) 510, a mixer 512, a driver amplifier (DA) 514, and a power amplifier (PA) 516. The BBF 510, the mixer 512, and the DA 514 may be included in a radio frequency integrated circuit (RFIC), while the PA 516 may be external to the RFIC. In some aspects of the present disclosure, the BBF 510 may include a tunable active filter. The BBF 510 filters the baseband signals received from the DAC 508, and the mixer 512 mixes the filtered baseband signals with a transmit local oscillator (LO) signal to convert the baseband signal of interest to a different frequency (i.e., upconvert from baseband to RF). This frequency conversion process ideally produces the sum and difference frequencies of the LO frequency and the frequency of the signal of interest. The sum and difference frequencies are referred to as the beat frequencies. The beat frequencies are typically in the RF range, such that the signals output by the mixer 512 are typically RF signals, which may be amplified by the DA 514 and/or by the PA 516 before transmission by the antenna 503.

The RX path 504 includes a low noise amplifier (LNA) 522, a mixer 524, and a baseband filter (BBF) 526. In some aspects of the present disclosure, the BBF 526 may include a tunable active filter. The LNA 522, the mixer 524, and the BBF 526 may be included in a radio frequency integrated circuit (RFIC), which may or may not be the same RFIC that includes the TX path components. RF signals received via the antenna 503 may be amplified by the LNA 522, and the mixer 524 mixes the amplified RF signals with a receive local oscillator (LO) signal to convert the RF signal of interest to a different baseband frequency (i.e., downconvert). The baseband signals output by the mixer 524 may be filtered by the BBF 526 before being converted by an analog-to-digital converter (ADC) 528 to digital I or Q signals for digital signal processing. In certain aspects of the present disclosure, the PA 516 and/or LNA 522 may be implemented using a differential amplifier.

While it is desirable for the output of an LO to remain stable in frequency, tuning the LO to different frequencies typically entails using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO frequency may be produced by a TX frequency synthesizer 518, which may be buffered or amplified by amplifier 520 before being mixed with the baseband signals in the mixer 512. Similarly, the receive LO frequency may be produced by an RX frequency synthesizer 530, which may be buffered or amplified by amplifier 532 before being mixed with the RF signals in the mixer 524.

As explained above, spur acts as frequency-selective noise due to imperfections in components of the transmit and receive chains at the transmitting and receiving device. One example component that may cause spur is a mixer (e.g. mixer 512 or 524). As explained above, a mixer ideally mixes the signals at its two inputs to produce an output signal with a frequency that is either the sum or difference of the frequencies of the input signals. At a transmitting device, an IF signal is mixed with an LO signal to output an RF signal of higher frequency than the IF signal, a process known as upconversion. At a receiving device, an RF signal is mixed with an LO signal to output an IF signal of lower frequency than the RF signal, a process known as downconversion. For ease of explanation, only downconversion will be discussed in the following paragraphs. It will however be clear that a similar analysis (i.e. equivalent analysis with the IF and RF labels swapped) applies to upconversion.

Ideal downconversion is described by the following equation, $$f_{IF}=|f_{RF}\pm f_{LO}| \quad (1)$$

for which the signal with frequency corresponding to the sum of the RF and LO frequencies can easily be filtered out leaving only the lower IF frequency corresponding to the difference (for upconversion whether the sum or difference frequency is used is of less importance).

In practice, nonlinearities in the mixer produce undesired mixing products with frequencies corresponding to higher order harmonics of the RF and LO frequencies. These undesired mixing products are one example of spurs and can be described by the following equation, $$f_{IF}=|mf_{RF}\pm nf_{LO}| \quad (2)$$

where m and n are integers respectively corresponding to the RF and LO frequencies that mix to create numerous combinations of spurious products.

Other undesired frequency signals caused by nonlinearities, or otherwise, in other components may also represent spurs. When such signals enter a mixer, not only may there be a spur corresponding to the input undesired frequency, but spurs at higher order harmonics of the input frequency may be produced from mixing products in the mixer.

Spurs may be produced by both analog and digital components of a wireless communication device. For example, digital circuitry may include processors, memories, controllers, etc., which may operate based on clocks. Digital circuits typically have large signal swings and generate lots of digital noise including spurs. The spurs from the digital circuits may have large levels because of the large and sharp signal swings of the digital circuits.

A spur at $f_0$ Hz and carrier frequency of $f_c$ Hz can be modeled in the time domain as:

$$s_I(n)=\exp\left(\frac{i2\pi nk_0}{N}\right),\ n=0,\ \ldots\ ,N-1, \quad (3)$$

where n identifies a discrete time sample and $$k_0=\frac{(f_0-f_c)}{\Delta f}$$

This time domain model represents a spike in the frequency domain centered on subcarrier $k_0$. While such a model would indicate that the spike would only impact a single subcarrier, in practice spurs have finite width in frequency and may therefore affect multiple subcarriers. Additionally, depending on the transmit or receive chain characteristics, there may be multiple such spurs affecting different groups of contiguous subcarriers.

A spur may be detected in the frequency domain by comparing a computed power for each subcarrier (or other frequency bin) against a corresponding threshold power. When the power of a subcarrier exceeds its threshold, it may be determined that a spur is present in that subcarrier. Spur detection may be performed periodically to ensure up-to-date spur information.

The magnitude and phase of any detected spur can be estimated in different ways and be used to compensate for its impact. For example, in response to detecting a spur, one or more spur parameters can be estimated. These may include an initial phase of the spur, a phase change rate of the spur, and an amplitude of the spur, which are stored in memory. Other methods of spur parameter estimation may be carried out, for example as shown in U.S. Pat. No. 9,065,686 B2, the methods of spur estimation of which are incorporated by reference herein. Considering a reception operation for example, a received signal is routed through a RX path of a receiving device (e.g. through components 522, 524, 526 and 528). A Fast Fourier Transform (FFT) unit may be downstream of the RX components shown in FIG. 5 and may be configured to transform time domain baseband signals to produce multiple parallel frequency domain output signals, each associated with a respective subcarrier. For each subcarrier in which a spur is detected, a reconstructed spur based on the estimated parameters may be subtracted from the corresponding FFT unit output, thus cancelling the spurs from the signal.

Such a method works best when the spur phase and magnitude parameters remain accurate over a long duration of time. If there is a discontinuity, for example when a communication direction changes (e.g. a switch from a downlink to an uplink slot), the spur parameter estimates may not be accurate. As a result, the impact of the spur cannot be fully compensated. The residual spur could still degrade the estimation of the modulated symbols/decoding of the TB, thereby reducing the achievable throughput. Moreover, when spur characteristics change, those characteristics may have to be estimated again. Since the estimation takes time, the performance will be impacted at least until the algorithm converges and the estimation is again accurate.

In multiplexing systems in which modulated symbols are mapped to frequency-domain subcarriers and time-domain samples are generated by taking an inverse FFT (IFFT) of the modulated symbols directly, for example CP-OFDM, filtered OFDM (f-OFDM), universal filtered multicarrier (UFMC), spur may impact a fixed set of resource elements (REs) of a scheduled entity. The present disclosure provides techniques for signaling the location of such REs or subcarriers from a scheduled entity to a scheduling entity so that the scheduling entity can better protect the modulated symbols on the REs or subcarriers. The disclosure also provides specific ways in which the scheduling entity may use the information concerning the location of the impacted REs or subcarriers.

Figure 6:
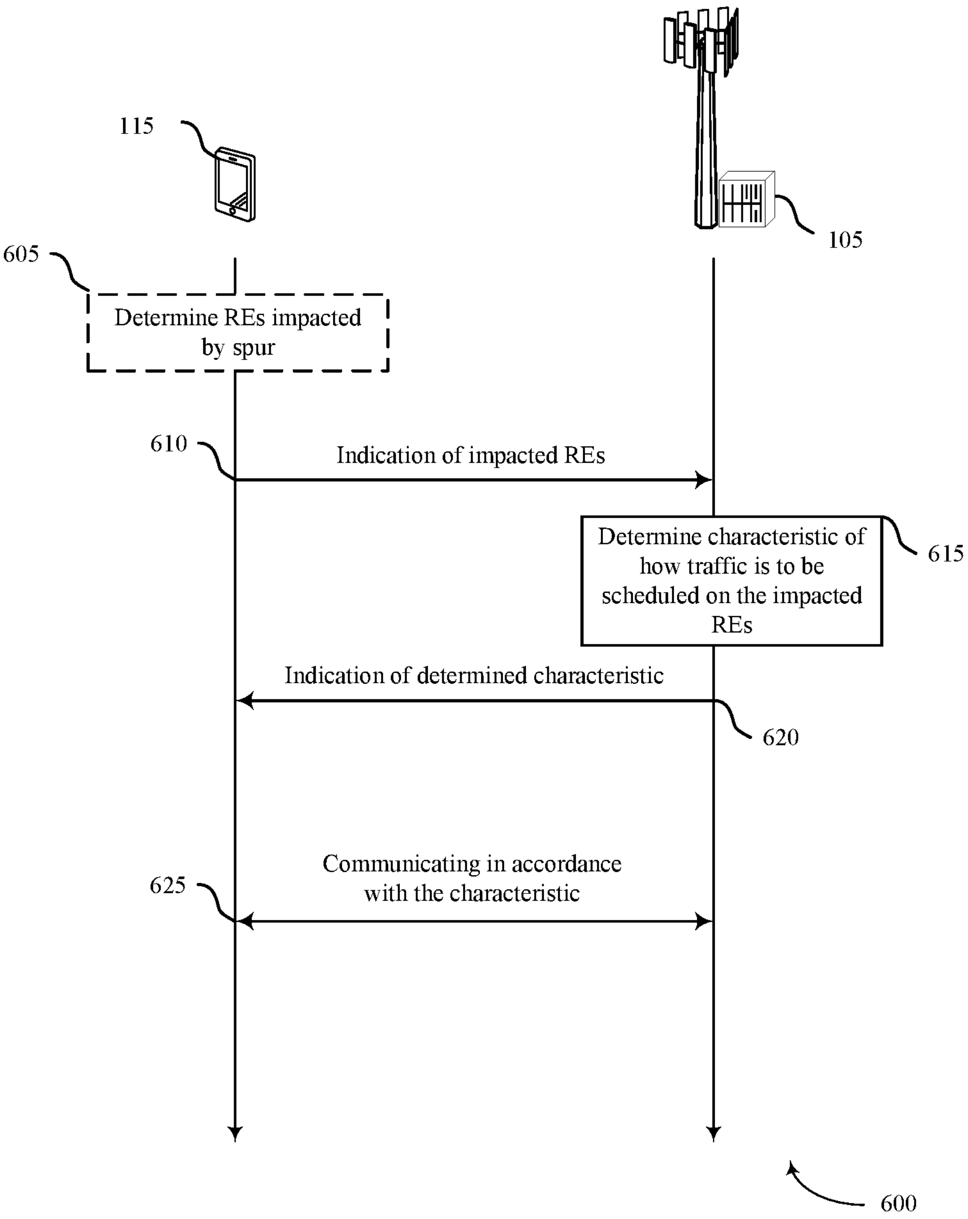
FIG. 6 is an example process for mitigating the impact of at least one spur in accordance with one or more aspects of the present disclosure.

FIG. 6 illustrates an example process flow 600 in accordance with the present disclosure. In some examples, the process flow 600 may implement aspects of wireless communications system 100. For example, the process flow 400 may include example operations associated with one or more of a scheduled entity (e.g. UE 115) or a scheduling entity (e.g. BS 105 or UE 115 or a network node), each of which may be examples of a UE or a base station as described with reference to FIG. 1. In the following description of the process flow 600, the operations may be performed in a different order than the example order shown, or may be performed in different orders or at different times. Some operations may also be omitted from the process flow 600, and other operations may be added to the process flow 600. The operations may support improvements to device transmission operations and, in some examples, may promote improvements to the device communications efficiency, among other benefits.

Optionally at 605, UE 115 may determine REs or subcarriers impacted by one or more spurs due to RX or TX chain imperfections. The location of any such spurs may be determined by any of the methods described above. Alternatively, UE 115 may be tested at manufacture to determine the location of spurs for the frequencies at which it is expected to transmit. The location of the spurs may accordingly be stored on the UE.

At 610, UE 115 transmits an indication to BS 105 indicating REs or subcarriers impacted by the one or more spurs. In some examples, the indication may be transmitted as part of capability signaling during initial access to the BS. For example, the indication may be indicated by UE 115 during a random access channel (RACH) procedure as radio resource control (RRC) signaling (e.g. an RRC information element or field therein). Alternatively, the indication may be sent periodically or may be triggered by an event. Such indications may be transmitted on a control channel (e.g. a physical uplink control channel (PUCCH)) as uplink control information (UCI) or in a data channel (e.g. a physical uplink shared channel (PUSCH)) as part of a MAC control element (MAC-CE) or RRC signaling.

There are a number of ways that the indication may be triggered by an event. For example, the scheduling entity may explicitly request that the scheduled entity transmit an indication of REs or subcarriers impacted by the one or more spurs. The request may take the form of downlink channel information (DCI), or be transmitted as a MAC-CE or RRC signaling. Alternatively, the scheduled entity may track the location of spurs (by periodically detecting spurs or otherwise). When the scheduled entity determines that at least one location of impacted subcarriers has changed, this may trigger the scheduled entity to indicate the up-to-date REs or subcarriers in the indication of REs or subcarriers impacted by the one or more spurs.

Another trigger for the indication of REs or subcarriers is when an operating frequency for communication between the scheduling entity and scheduled entity changes. For example, the scheduling entity may indicate to the scheduled entity that it is to switch to a different bandwidth part (BWP), component carrier (CC) or band. In a carrier aggregation or dual connectivity scenario, the scheduling entity may also indicate to the scheduled entity that it is to add or remove a cell (e.g. an SCell). It is noted that removal of a cell may affect spur location as the transmit or receive components of the scheduled entity may be reconfigured to effect the removal. In response to such switching or addition/removal indications from the scheduling entity, the scheduled entity may transmit the indication of REs or subcarriers impacted by the one or more spurs. Other triggers may include when the scheduling entity indicates a change in communication direction from uplink to downlink or more generally, from communication from the scheduling entity to from the scheduled entity.

There are a number of options for the form the indication of REs or subcarriers impacted by the one or more spurs may take. For example, the indication may take the form of a report of the impacted subcarriers for different frequency units. The report may indicate the set of impacted subcarriers for one or more specific BWPs, CC, or bands (e.g. a BWP, CC or band on which the scheduled entity is scheduled, or is expected to be scheduled, to operate). The indication or report may comprise the subcarriers impacted by a spur for both transmission and reception operations by the scheduled entity (different sets of subcarriers may be impacted in transmission and reception due to different imperfections in the TX and RX chains, so each set may be indicated in a separate data structure in the indication or report). Alternatively, separate indications or reports may be transmitted for transmission and reception by the scheduled entity. The set of impacted subcarriers may be indicated at a subcarrier level of frequency granularity or other sub-resource block level of frequency granularity.

In some examples, the scheduled entity may send assistance information or a capability report together with the indication of REs or subcarriers impacted by the one or more spurs. For example, the assistance information or capability report may indicate how well the scheduled entity can tolerate the impact of spur, e.g. a spur cancellation capability. Such assistance information may allow the scheduling entity to determine how to protect modulation symbols on the impacted REs or subcarriers in a way that reflects a scheduled entity's capabilities. This may improve efficiency or throughput as the impact of the spur may not be overcompensated. Such assistance information may also be transmitted separately from the indication of the impacted REs or subcarriers. For example The options for the forms of the indication and assistance information or capability report described above may be used in conjunction with the single, periodic, and any of the triggered ways of transmitting the indication also described above.

At 615, BS 105 determines one or more characteristics of how traffic is to be scheduled on the impacted REs or subcarriers. Such characteristics are chosen to better protect modulation symbols on the impacted REs or subcarriers, or to improve communication by reducing errors. For example, the scheduling entity may simply not map modulation symbols to the subcarriers indicated as being impacted by one or more spurs, i.e. the subcarriers or corresponding REs are nulled. That is, the one or more characteristics may include a nulled state of the subcarriers or corresponding REs and may be punctured or rate matched around at the transmitter and punctured or de-rate matched around at the receiver.

Alternatively, the one or more characteristics may include a modulation order. The scheduling entity may determine that the impacted subcarriers are to use a lower order modulation order than the modulation order used for the rest of a scheduling assignment. For example, if a DL channel (e.g. physical downlink shared channel (PDSCH)) is scheduled with a 256-point quadrature amplitude modulation (256QAM) modulation scheme, the scheduling entity may indicate that for the set of impacted subcarriers, quadrature phase-shift keying (QPSK) is used instead. The set of modulation symbols of lower order for the impacted subcarriers could be from a separate constellation with a smaller order or could use some points of the original or nominal constellation. In the example above, QPSK symbols can be constructed by taking the 4 points of same magnitude from the 256QAM constellation (e.g. the 4 outermost points of the 256QAM constellation have the greatest separation, and may therefore be selected because they have a higher probability of being disambiguated). The selection of a subset of points from the original or nominal constellation may be advantageous because, for a transmission operation by the scheduled entity, rather than generating modulation symbols completely separately for the impacted subcarriers, the choice of modulation symbols is simply limited for the impacted subcarriers. In a reception operation, the scheduled may simply be configured to interpret the selected points according to a lower order modulation scheme.

Using a more reliable modulation order may be dependent on the original or nominal modulation order used for the transmission. If the original or nominal modulation order is lower than a threshold modulation order, the same modulation order may be used for all scheduled subcarriers irrespective of whether they are impacted by a spur. If higher than the threshold, the impacted subcarriers may use a lower modulation order than the original or nominal modulation order. For example, if a transmission is scheduled with QPSK, QPSK may be configured on all subcarriers. However, if a transmission is scheduled with 256QAM, QPSK is used on the impacted REs.

The lower modulation order may be fixed for all scheduled entities for a given original or nominal modulation order, fixed for a specific scheduled entity for a given original or nominal modulation order or may be selected depending on factors such as UE capability. For example, a scheduled entity may determine a degree to which subcarriers are affected by a spur. If the scheduled entity determines that it can tolerate the impact of a spur In another example, the one or more characteristics may include a coding scheme or rate. A scheduling entity may determine that bits to be mapped to subcarriers that are not impacted by a spur are to be encoded using an original or nominal coding scheme or rate, and that bits to be mapped to subcarriers impacted by a spur are to be encoded using a coding scheme or rate with higher reliability than the original or nominal coding scheme or rate. For example, a low-density parity-check code (LDPC) may be used for bits to be mapped to impacted subcarriers and a simpler coding scheme may be used for bits to be mapped to a subcarrier not impacted by a spur, a simpler encoding than an LDPC may be used to generate the bits for modulation symbols mapped to subcarriers not impacted by a spur.

In an example of multi-layer coding, the bits assigned to a given modulation symbol may have different reliability, e.g., the most significant bit (MSB) bits may be more reliable than the least significant bit (LSB) bits. Because of this, in some systems, different coding schemes or different coding rates may be used to generate the coded bits to be mapped to positions with different reliability. For example, a LDPC could be used for the unreliable bits, whereas the more reliable bits are either uncoded or coded using a simpler coding scheme than an LDPC. However, a narrow-band imperfection such as a spur could make all bits equally unreliable. Accordingly, while a scheduling entity may schedule subcarriers that are not impacted by a spur with coding schemes or rates that are dependent on the reliability of the bits represented by a modulation symbol (less reliable bits are coded using a more robust coding scheme or rate), for the subcarriers or REs that may be impacted by a spur, the coding schemes or rates are chosen to have high reliability for all bits (e.g. a same scheme or one at least as reliable as the coding scheme used for the LSBs). For example, if an LDPC is used for less reliable bits and a simpler coding scheme is used for more reliable bits for modulated symbols mapped to a subcarrier not impacted by a spur, LDPC encoding could be used to obtain the bits for a modulated symbols mapped to a subcarrier impacted by a spur.

Using a more reliable coding scheme or rate may be dependent on the original or nominal coding scheme or rate used for the transmission. If the original or nominal coding scheme or rate is of a type deemed sufficiently reliable or for which there are insufficient more reliable schemes, the same coding scheme may be used for modulation symbols to be mapped to all subcarriers irrespective of whether the subcarriers are impacted by a spur. For example, if the original or nominal coding scheme does not use LDPC encoding, the original or nominal coding scheme may be used for all subcarriers. In other examples, if the original or nominal coding rate is lower than a threshold coding rate, the same coding rate may be used for all scheduled subcarriers irrespective of whether they are impacted by a spur. If higher than the threshold, the impacted subcarriers may use a lower modulation order than the original or nominal modulation order. For example, if a transmission is scheduled with a coding rate of 0.5, the coding rate of 0.5 may be configured on all bits subcarriers. However, if a transmission is scheduled with a coding rate of 0.8, a coding rate of 0.5 on the impacted REs.

The more reliable coding scheme or rate may be fixed for all scheduled entities for a given original or nominal coding scheme or rate, fixed for a specific scheduled entity for a given original or nominal coding scheme or rate or may be selected depending on factors such as UE capability.

While the examples relating to use of different modulation schemes or coding schemes/rates have been described separately, it will be appreciated that the determination of whether and how to use a different modulation scheme, coding scheme/rate or both in the impacted resources may be made jointly, e.g. by selection of different modulation and coding schemes (MCSs). In some examples, the scheduling entity may determine that the impacted subcarriers are to use a less reliable MCS than the MCS used for the rest of a scheduling assignment. If the original or nominal MCS is less than a threshold MCS, the same MCS may be used for all scheduled subcarriers irrespective of whether they are impacted by a spur. If higher than the threshold, the impacted subcarriers may use a less MCS than the original or nominal MCS.

In further examples, the scheduling entity may determine that only a subset of the impacted subcarriers are to be treated differently from the subcarriers that are not impacted by a spur. Similarly, the scheduling entity may determine to use a different combination of nulling, different modulation order, coding scheme/rate and MCS in different subsets of impacted resources.

The determination of the modulation order or coding scheme/rate to use for the impacted subcarriers may also be dependent on the assistance information described above. For example, if an original or nominal modulation order is 256QAM and a scheduled entity has indicated a relatively poor capability to cancel the impact of a spur, the scheduling entity may determine to schedule the impacted subcarriers using a more reliable modulation order like QPSK (or a more reliable coding scheme/coding rate/MCS). For a scheduled entity that has indicated a relatively good capability to cancel the impact of spur the scheduling entity may determine to schedule the impacted subcarriers using a less reliable modulation order like 16QAM (or a less reliable coding scheme/coding rate/MCS).

The assistance information or capability report described above in relation to operation 610 may also take the form of a requested modulation order, coding scheme/rate or MCS to use for impacted resources. For example, the scheduled entity may indicate what modulation order, coding scheme/rate or MCS to use for impacted resources for one or more original or nominal modulation orders, coding schemes/rates or MCS to use for impacted resources. Taking modulation order as an example, for a nominal 256QAM modulation order, the scheduled entity may request that 16QAM is used for impacted subcarriers. The assistance information or capability report may comprise modulation orders for impacted resources for given nominal modulation orders. An example is shown in Table 1 below. Similar tables are applicable for coding schemes/rates or MCS.

TABLE 1

| Nominal Modulation Order | Modulation Order for Impacted Subcarriers |
|---|---|
| 1024QAM | 64QAM |
| 256QAM | 16QAM |
| 64QAM | QPSK |
| 16QAM | BPSK |
| QPSK | Nulled |

In another example, all modulation orders for impacted subcarriers may be the same (e.g. BPSK, QPSK) irrespective of the nominal modulation order.

To reduce control overhead compared to transmitting assistance information or capability report for multiple potential nominal modulation orders, coding schemes/rates or MCSs, the scheduling entity may indicate the original or nominal modulation order, coding scheme/rate or MCS to the scheduled entity, and the scheduled entity may request a modulation order, coding scheme/rate or MCS for the impacted subcarriers in response thereto.

At 620, BS 105 transmits an indication to UE 115 of the one or more characteristics. The indication of the one or more characteristics indicates that a more reliable modulation order, coding scheme/rate, MCS or combination thereof is to be used for the impacted resources, or that the impacted resources are to be nulled. The impacted resources The absence of such an indication may indicate to the scheduled entity that the impacted subcarriers are not to be scheduled differently from subcarriers not impacted by a spur. For example, the indication of the one or more characteristics may indicate that all of the impacted subcarriers are to be nulled or that all of the impacted subcarriers are to use at least one of a modulation order, coding scheme/rate or MCS different from the nominal or original one related to a scheduling assignment. In this case, that all of the impacted subcarriers are to be adjusted is implicit to the scheduled entity based on the subcarriers indicated in operation 610. Alternatively, the indication of the one or more characteristics may indicate which subcarriers of the impacted subcarriers are to be nulled and which are to use at least one of a different modulation order, coding scheme/rate or MCS. Accordingly, the present disclosure allows for multiple subsets of the impacted subcarriers to be indicated as having different combinations of modulation orders, coding scheme/rate or MCSs, or being nulled.

In some examples, the indication may be signaled semi-statically, e.g., via RRC signaling, and may define one or more rules. As an example, the scheduling entity may indicate to the scheduled entity that for all impacted subcarriers within a scheduling assignment with 256QAM are sent via QPSK, and that for a scheduling assignment with 16QAM, they are nulled, etc. The information may be the same or similar to Table 1 above, i.e. indicating a modulation order, coding scheme/rate, MCS or nulling scheme for each corresponding nominal modulation order, coding scheme/rate or MCS.

The indication of the at least one characteristic may be indicated more dynamically via a scheduling grant. This may be performed through DCI of a DL grant (e.g. in DCI for PDSCH resources) or of an UL grant (e.g. in DCI for PUSCH resources). Such an indication, as well as explicitly or implicitly indicating frequency resources to adjust may also indicate (implicitly or explicitly) when and for how long the scheduling decision is valid. For example, when the indication of the at least one characteristic is transmitted in a scheduling assignment, it may be implicit to the scheduled entity that the at least one characteristic is valid for the duration of the resources granted by the scheduling assignment. In other cases, the indication of when and for how long the scheduling decision is valid may be explicitly signaled to the scheduled entity.

If the decision represented by the at least one characteristic is to null the impacted subcarriers, this may be performed for the scheduled resources in a subset of slots to provide the scheduled entity means to better estimate a spur. For example, impacted subcarriers may be nulled in PDSCHs sent over the first DL slot after a DL/UL switch. After that, all REs are assumed to be used. When and for how long the scheduling decision is valid may depend on transmission direction (e.g. UL or DL). Accordingly, the indication of when and for how long the scheduling decision is valid may comprise separate indications for DL and UL.

At 625, UE 115 and BS 105 communicate in accordance with the at least one characteristic. For example, if a scheduling entity schedules a physical downlink shared channel (PDSCH) in DCI, not only will the scheduling entity adjust how it transmits the PDSCH on the impacted subcarriers (e.g. nulling or rate matching PDSCH around subcarriers/REs, adjusting a bit encoding operation or modulation operation according to those described in relation to FIG. 6), but the scheduled entity performs corresponding operations when receiving the PDSCH (e.g. nulling or de-rate matching PDSCH around subcarriers/REs, adjusting a bit decoding operation or demodulation operation according to those described in relation to FIG. 6).

In some cases, the impacted subcarriers may be assigned to carry reference signals such as demodulation reference signals (DMRS). A scheduling entity may therefore perform one or more actions to ensure that the channel estimation function of the reference signals remains accurate.

In some examples, a reference signal pattern may be shifted in frequency within a resource block (RB) to avoid subcarriers impacted by a spur. Reference signals such as DMRS typical occupy a subset of REs within a symbol period in a RB. Accordingly, shifting the REs used for reference signals by a certain number of subcarriers within a RB so that the reference signals do not overlap with impacted subcarriers may enable accurate channel estimation to be maintained in the presence of a spur. For example, in response to receiving an indication of frequency resources impacted by a spur at the scheduled entity, operation 615 in FIG. 6 may comprise determining a shift in reference signal pattern to avoid subcarriers impacted by spur as the at least one characteristic of how traffic is to be scheduled. The shift of the reference signal pattern may be limited to RBs where impacted subcarriers are located or may be applied to a group of adjacent RBs, for example all RBs in one physical resource block group (PRG).

Instead of shifting a reference signal pattern within a RB, a different pattern can be selected for that pattern so that REs used for reference signals do not overlap with impacted subcarriers. Again, the use of these patterns could be limited to RBs where impacted subcarriers are located or may be applied to a group of adjacent RBs (e.g. PRG).

In other examples, the at least one characteristic of how traffic is to be scheduled as determined in operation 615 of FIG. 6 may be that the impacted reference signal REs are nulled and not used for channel estimation. In such cases, if the number of impacted reference signal REs is beyond a threshold number, the RBs or PRGs comprising the reference signal REs are assumed not to be used for data transmission because channel estimation would be too inaccurate. As an example, if one RB inside a PRG is not used for communicating (625) between the scheduling and scheduled entity, the rest are used and the scheduled or scheduling entity may rate match or de-rate match a scheduled transmission around the unused RB.

It is to be emphasized that the above description of FIG. 6 may involve adjusting how traffic is transmitted and received at both the scheduling entity and the scheduled entity. For example, if a scheduling entity schedules a physical downlink shared channel (PDSCH) in DCI, not only will the scheduling entity adjust how it transmits the PDSCH on the impacted subcarriers (e.g. nulling or rate matching PDSCH around subcarriers/REs, adjusting a bit encoding operation or modulation operation according to those described in relation to FIG. 6), but the scheduled entity performs corresponding operations when receiving the PDSCH (e.g. nulling or de-rate matching PDSCH around subcarriers/REs, adjusting a bit decoding operation or demodulation operation according to those described in relation to FIG. 6). Similarly, if a scheduling entity schedules a physical uplink shared channel (PUSCH) in DCI, not only will the scheduled entity adjust how it transmits the PUSCH on the impacted subcarriers (e.g. nulling or rate matching PUSCH around subcarriers/REs, adjusting a bit encoding operation or modulation operation according to those described in relation to FIG. 6), but the scheduled entity performs corresponding operations when receiving the PDSCH (e.g. nulling or de-rate matching PDSCH around subcarriers/REs, adjusting a bit decoding operation or demodulation operation according to those described in relation to FIG. 6).

Furthermore, while much of the discussion related to FIG. 6 focuses on an example where the scheduling entity is a BS 105 and the scheduled entity is a UE 115, it will be appreciated that the disclosure of FIG. 6 may also relate to sidelink communication between two UEs 115. In this case, a first UE 115 may schedule communications between it and a second UE 115, i.e. the first UE 115 may represent a scheduling entity and the second UE may represent a scheduled entity. In accordance with FIG. 6, the first UE 115 may schedule traffic on a physical sidelink shared channel (PSSCH) using sidelink control information (SCI).

While the above discussion has focused on reporting imperfections on frequency resources resulting from spurs generated in a wireless communication device, it will be appreciated that a scheduling entity need not be informed of the cause of the imperfection, only that the imperfection exists so that it is aware to treat them differently (e.g. the frequency resources affected by the imperfection have different transmission requirements than other frequency resources) in a subsequent scheduling operation. The extent in frequency of the imperfections may be smaller than a smallest frequency domain scheduling unit of the wireless communication, or otherwise they could be compensated for using normal scheduling operations.

Figure 7:
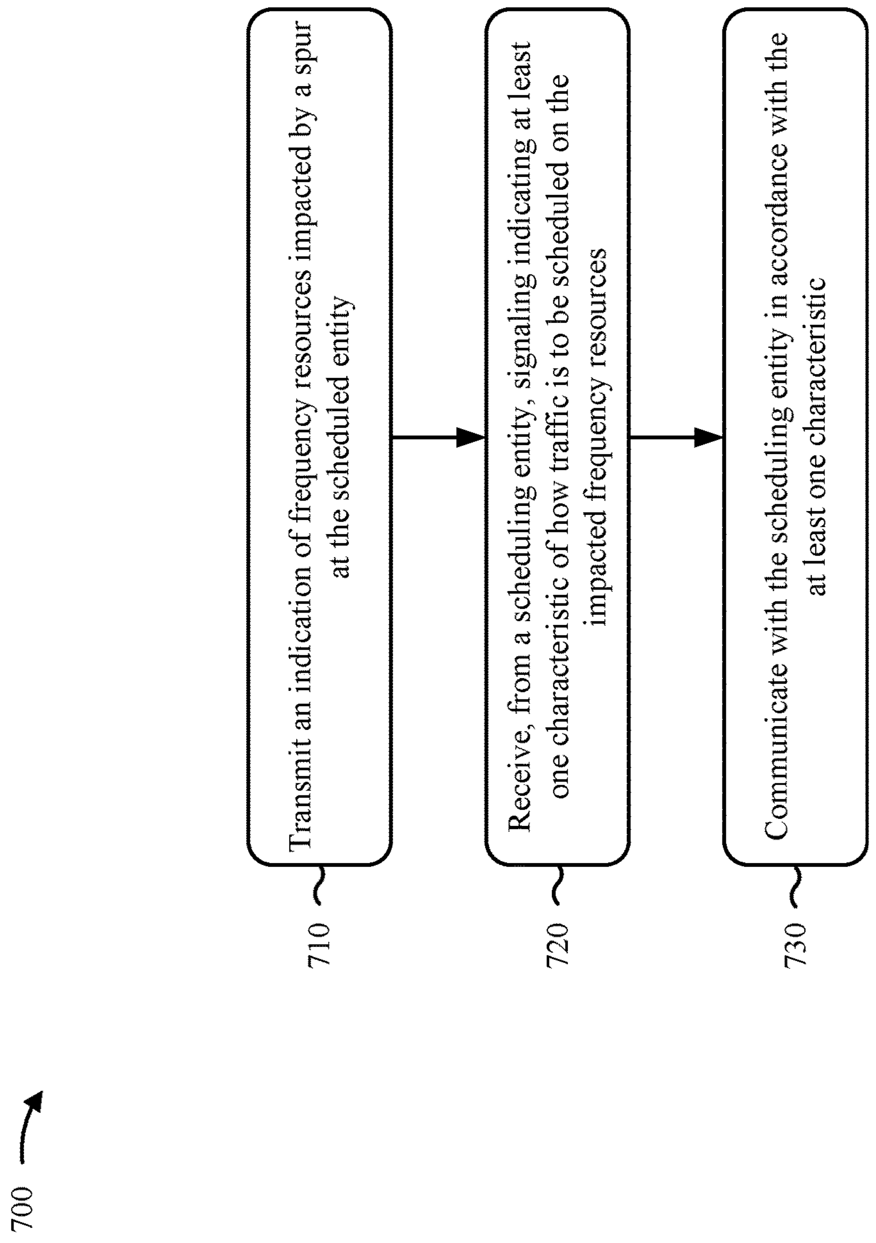
FIG. 7 is a diagram illustrating an example process for mitigating the impact of at least one spur, performed by a scheduled entity, in accordance with one or more aspects of the present disclosure.

FIG. 7 is a diagram illustrating an example process 700 for mitigating the impact of at least one spur, performed by a scheduled entity, in accordance with various aspects of the present disclosure. Example process 700 is an example where a scheduled entity, such as a UE 115, performs operations associated with mitigating the impact of a spur.

As shown in FIG. 7, in some aspects, process 700 may include transmitting an indication of frequency resources that have different transmission requirements from those of other frequency resources in a smallest frequency domain scheduling unit comprising the frequency resources for the scheduled entity (block 710). For example, the scheduled entity (using transmit processor 264, controller/processor 280, memory 282, among other possibilities/examples) may transmit an indication of subcarriers impacted by a spur at the scheduled entity, as described above.

As further shown in FIG. 7, in some aspects, process 700 may include receiving, from a scheduling entity, signaling indicating at least one characteristic of how a channel is to be scheduled on the impacted frequency resources (block 720). For example, the scheduling entity (using receive processor 258, controller/processor 280, memory 282, among other possibilities/examples) may receive an indication of at least one characteristic indicating that a more reliable modulation order, coding scheme/rate, MCS or combination thereof is to be used for the impacted resources, or that the impacted resources are to be nulled, as described above.

As further shown in FIG. 7, in some aspects, process 700 may include communicating with the scheduling entity in accordance with the at least one characteristic (block 730). For example, the scheduling entity (using receive processor 258, transmit processor 264, controller/processor 280, memory 282, among other possibilities/examples) may receive an indication of at least one characteristic indicating that a more reliable modulation order, coding scheme/rate, MCS or combination thereof is to be used for the impacted resources, or that the impacted resources are to be nulled, as described above.

Figure 8:
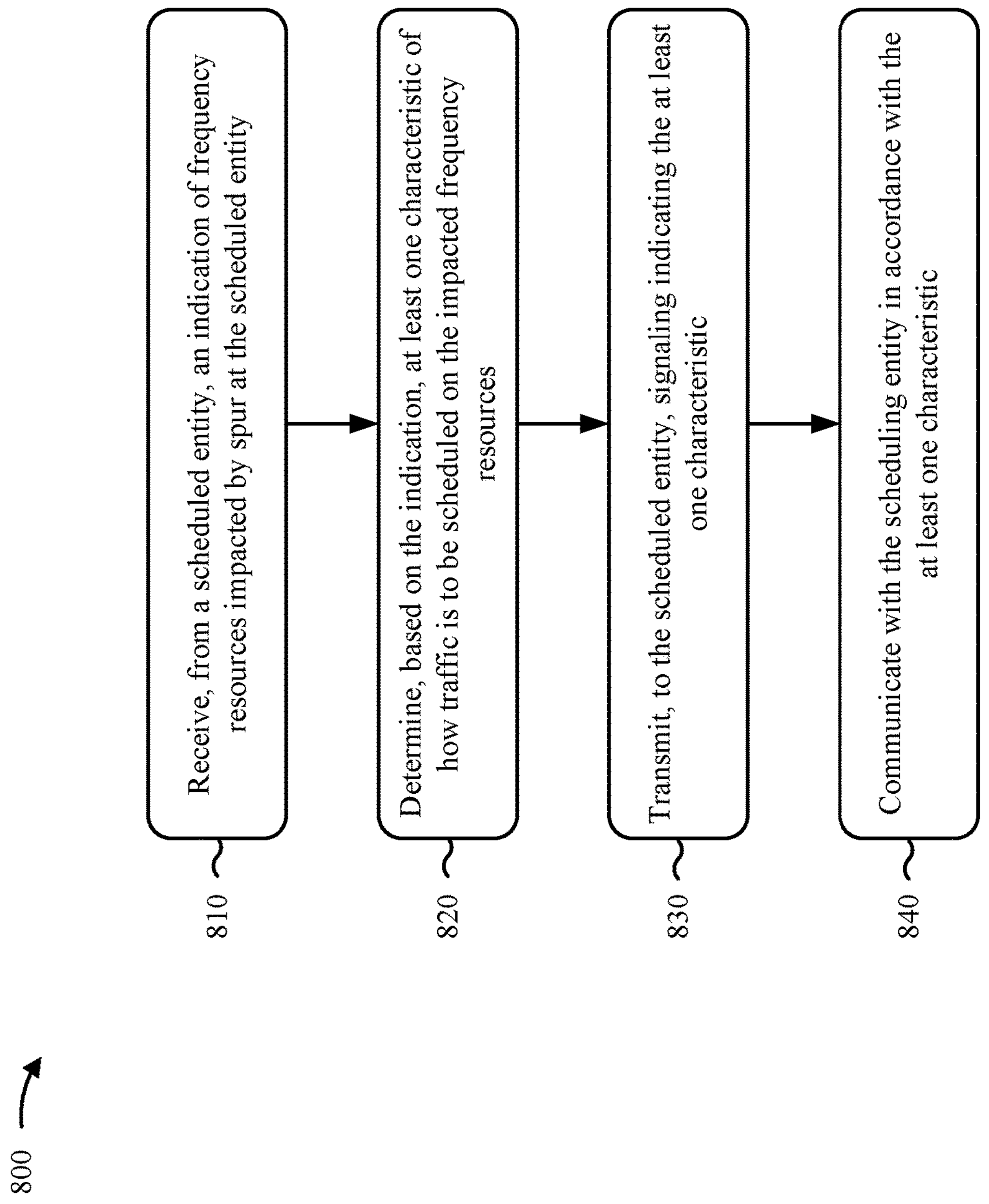
FIG. 8 is a diagram illustrating an example process for mitigating the impact of at least one spur, performed by a scheduling entity, in accordance with one or more aspects of the present disclosure.

FIG. 8 is a diagram illustrating an example process 800 for mitigating the impact of at least one spur, performed by a scheduling entity, in accordance with various aspects of the present disclosure. Example process 800 is an example where a scheduling entity, such as a BS 105 or a UE 115, performs operations associated with mitigating the impact of at least one spur.

As shown in FIG. 8, in some aspects, process 800 may include receiving, from a scheduled entity, an indication of frequency resources that have different transmission requirements from those of other frequency resources in a smallest frequency domain scheduling unit comprising the frequency resources for the scheduled entity (block 810). For example, the scheduling entity (using receive processor 238, controller/processor 240, memory 242, receive processor 258, controller/processor 280, memory 282, among other possibilities/examples) may receive an indication of subcarriers impacted by a spur at the scheduled entity, as described above.

As further shown in FIG. 8, in some aspects, process 800 may include determining, based on the indication, at least one characteristic of how a channel is to be scheduled on the impacted frequency resources (block 820). For example, the scheduling entity (using controller/processor 240, memory 242, controller/processor 280, and memory 282, among other possibilities/examples) may determine at least one characteristic indicating that a more reliable modulation order, coding scheme/rate, MCS or combination thereof is to be used for the impacted resources, or that the impacted resources are to be nulled, as described above.

As further shown in FIG. 8, in some aspects, process 800 may include transmitting, to the scheduled entity, signaling indicating the at least one characteristic (block 830). For example, the scheduling entity (using transmit processor 220, controller/processor 240, memory 242, transmit processor 264, controller/processor 280, memory 282, among other possibilities/examples) may transmit an indication of at least one characteristic indicating that a more reliable modulation order, coding scheme/rate, MCS or combination thereof is to be used for the impacted resources, or that the impacted resources are to be nulled, as described above.

As further shown in FIG. 8, in some aspects, process 800 may include communicating with the scheduling entity in accordance with the at least one characteristic (block 840). For example, the scheduling entity (using transmit processor 220, receive processor 238, controller/processor 240, memory 242, transmit processor 264, receive processor 258, controller/processor 280, memory 282, among other possibilities/examples) may communicate, based at least in part on the at least one characteristic indicating that a more reliable modulation order, coding scheme/rate, MCS or combination thereof is to be used for the impacted resources, or that the impacted resources are to be nulled, as described above.

Figure 9:
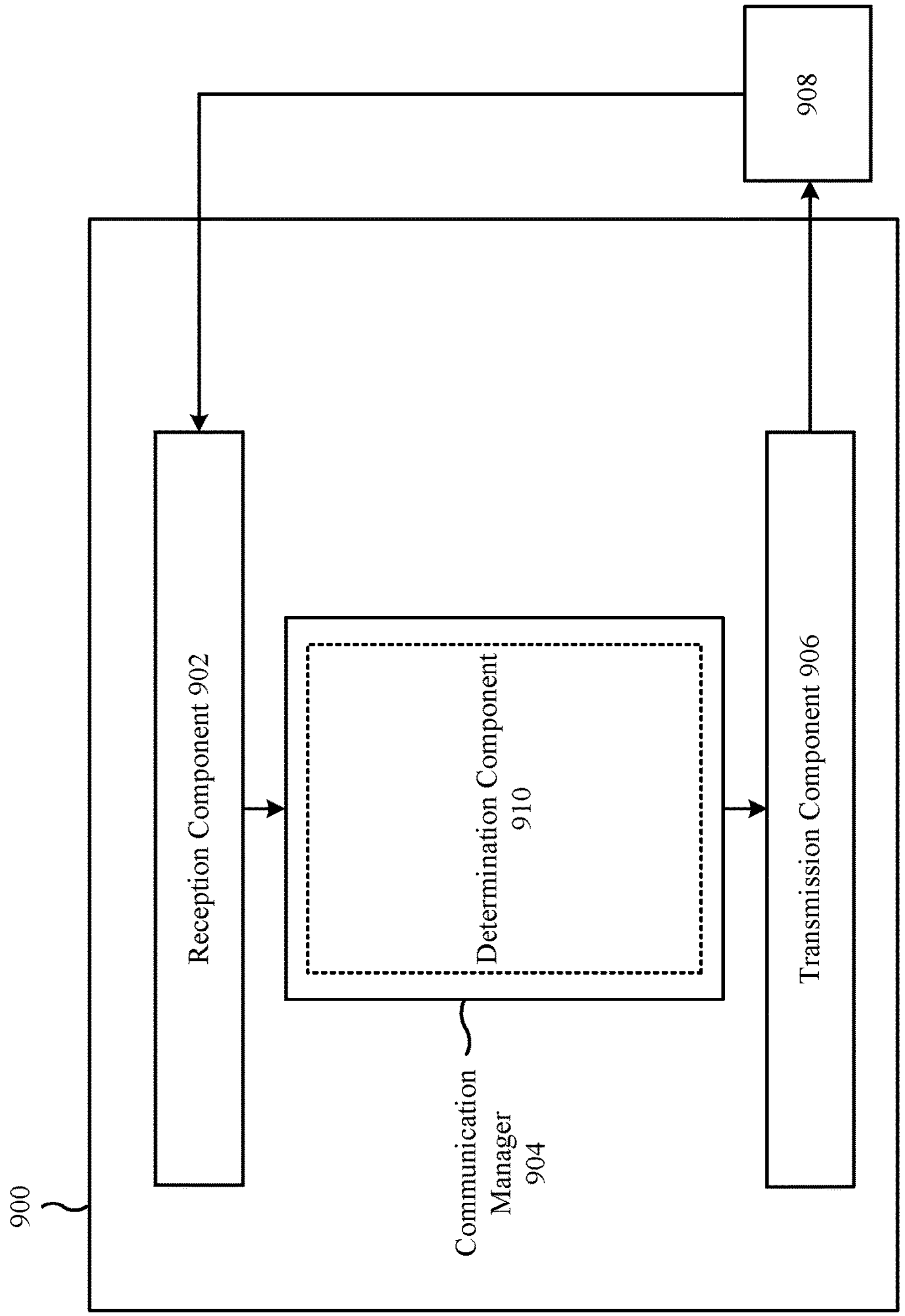
FIG. 9 is a block diagram of an example apparatus for wireless communication at a scheduling entity in accordance with one or more aspects of the present disclosure.

FIG. 9 is a block diagram of an example apparatus 900 for wireless communication. The apparatus 900 may be a scheduling entity such as a UE 115 or a BS 105, or a scheduling entity may include the apparatus 900. In some aspects, the apparatus 900 includes a reception component 902, a communication manager 904 (e.g. communications manager 101-*a* or 101-*b*), and a transmission component 906, which may be in communication with one another (for example, via one or more buses). As shown, the apparatus 900 may communicate with another apparatus 908 (such as a UE 115) using the reception component 902 and the transmission component 906.

In some aspects, the apparatus 900 may be configured to perform one or more operations described herein in connection with FIG. 6. Additionally or alternatively, the apparatus 900 may be configured to perform one or more processes described herein, such as process 800 of FIG. 8. In some aspects, the apparatus 900 may include one or more components of the scheduling entity described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the receiver described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the scheduling entity described above in connection with FIG. 2. In some aspects, the transmission component 906 may be co-located with the reception component 902 in a transceiver.

The communication manager 904 may receive (or may cause reception component 902 to receive), from apparatus 908, an indication of frequency resources impacted by a spur at a scheduled entity. In some aspects, the indication may be an explicit indication or an implicit indication. The communication manager 904 may determine, based on the indication, at least one characteristic of how traffic is to be scheduled on the impacted frequency resources. In some aspects, the communication manager 904 may transmit (or may cause transmission component 906 to receive), to apparatus 908 signaling indicating the at least one characteristic. The communication manager 904 may communicate (or may cause reception component 902 to receive and/or transmission component 906 to transmit), with apparatus 908 in accordance with the at least one characteristic. In some aspects, the communication manager 904 may include a controller/processor, a memory, a scheduler, a communication unit, or a combination thereof, of the scheduling entity described above in connection with FIG. 2.

In some aspects, the communication manager 904 may include a one or more components such as a determination component 910. Alternatively, the one or more components may be separate and distinct from the communication manager 904. In some aspects, the one or more components may include or may be implemented within a controller/processor, a memory, a scheduler, a communication unit, or a combination thereof, of the receiver described above in connection with FIG. 2. Additionally or alternatively, the one or more components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 910 may determine, based on the indication of frequency resources impacted by a spur at the scheduled entity, at least one characteristic of how traffic is to be scheduled on the impacted frequency resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
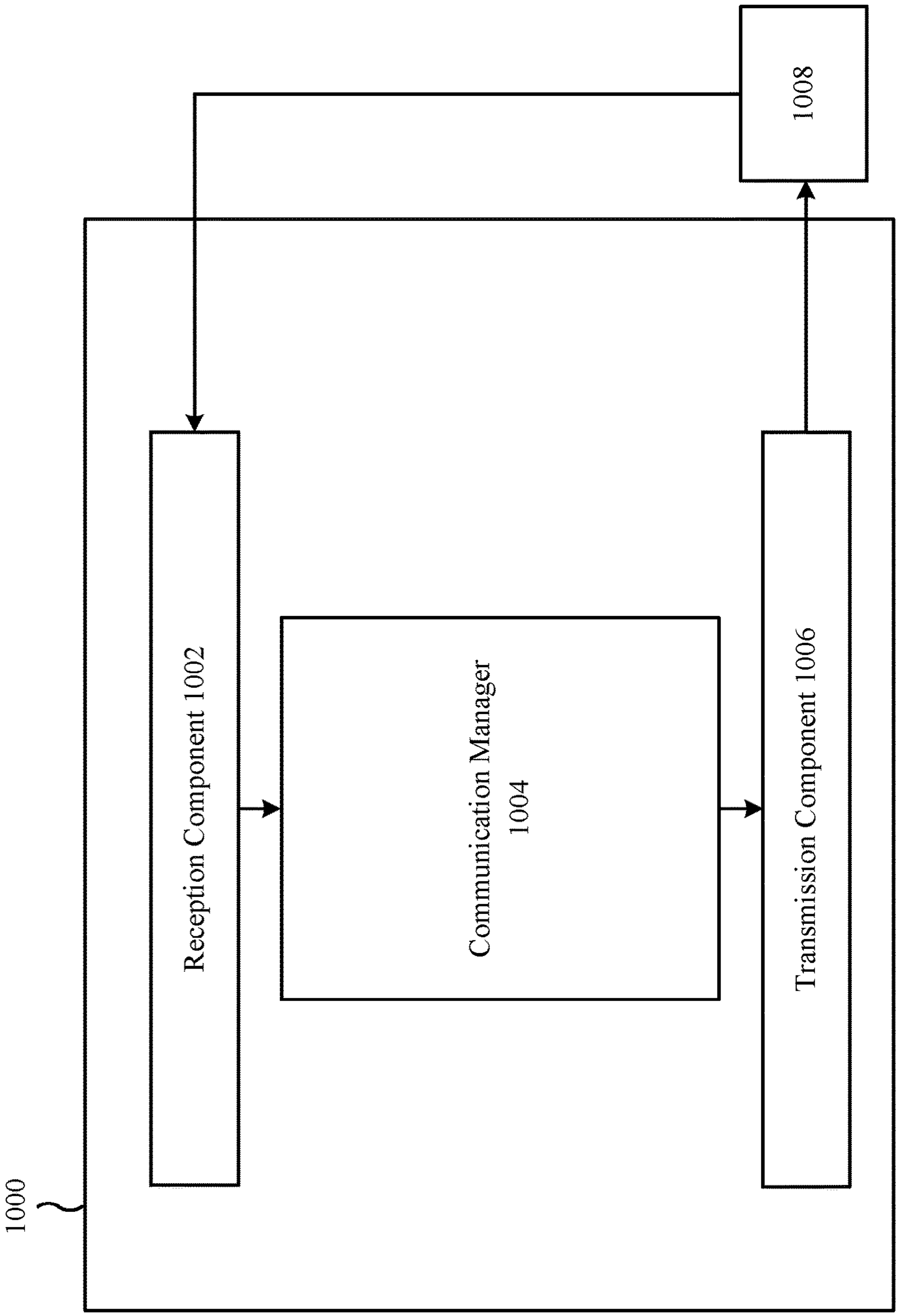
FIG. 10 is a block diagram of an example apparatus for wireless communication at a scheduled entity in accordance with one or more aspects of the present disclosure.

FIG. 10 is a block diagram of an example apparatus 1000 for wireless communication. The apparatus 1000 may be a scheduled entity such as a UE 115, or a scheduled entity may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE 115, a BS 105, or another wireless communication device) using the reception component 1002 and the transmission component 1006.

In some aspects, the apparatus 1000 may be configured to perform one or more operations described herein in connection with FIG. 6. Additionally or alternatively, the apparatus 1000 may be configured to perform one or more processes described herein, such as process 700 of FIG. 7. In some aspects, the apparatus 1000 may include one or more components of the scheduled above described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the transmitter described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 10906 may include one or more antennas, a modulator, a transmit MIMO processor, a transmit processor, a controller/processor, a memory, or a combination thereof, of the transmitter described above in connection with FIG. 2. In some aspects, the transmission component 1006 may be co-located with the reception component 1002 in a transceiver.

The communication manager 1004 may transmit (or may cause transmission component 1006 to transmit), to apparatus 1008, an indication of frequency resources impacted by a spur at the scheduled entity. The communication manager 1004 may receive (or may cause reception component 1002 to receive), to apparatus 1008, signaling indicating at least one characteristic of how traffic is to be scheduled on the impacted frequency resources. The communication manager 1004 may communicate (or may cause reception component 1002 to receive or transmission component 1006 to transmit), with apparatus 1008 in accordance with the at least one characteristic. In some aspects, the communication manager 1004 may include a controller/processor, a memory, a scheduler, a communication unit, or a combination thereof, of the transmitter described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

It should be noted that the methods described herein describe possible implementations, and that the operations may be rearranged or otherwise modified and that other implementations are possible. Further, aspects from two or more of the methods may be combined.

Aspect 1: A method of wireless communication performed by a scheduled entity, the method comprising: transmitting an indication of frequency resources that have different transmission requirements from those of other frequency resources in a smallest frequency domain scheduling unit comprising the frequency resources for the scheduled entity; receiving, from a scheduling entity, signaling indicating at least one characteristic of how a channel is to be scheduled on the frequency resources; and communicating with the scheduling entity in accordance with the at least one characteristic.

Aspect 2: The method of aspect 1, wherein: the smallest frequency domain scheduling unit is a resource block (RB) and the frequency resources are indicated at a subcarrier or other sub-RB level of granularity; and the indication of frequency resources comprises an indication of frequency resources per a bandwidth part (BWP), a component carrier (CC), a band or a transmission direction between the scheduled entity and the scheduling entity.

Aspect 3: The method of aspect 1 or 2, wherein the indication of frequency resources is transmitted: during an initial access operation to a base station, wherein the base station is the scheduling entity; as part of a capability report of the scheduled entity; periodically; or when triggered by an event.

Aspect 4: The method of aspect 3, wherein the event is: receiving a request from the scheduling entity to indicate frequency resources that have different transmission requirements from those of other frequency resources in a smallest frequency domain scheduling unit comprising the frequency resources; detecting, by the scheduled entity, that at least one location of subcarriers that have different transmission requirements from those of other frequency resources in a smallest frequency domain scheduling unit comprising the frequency resources has changed; a change in an operating frequency for communication between the scheduling entity and scheduled entity; addition or removal of a cell in carrier aggregation or dual connectivity; or a change in communication direction between the scheduling entity and scheduled entity.

Aspect 5: The method of any of aspects 1-4, further comprising: receiving a scheduling assignment for resources including the frequency resources, wherein the scheduling assignment indicates a nominal modulation order, coding scheme, coding rate, or modulation and coding scheme (MCS); and communicating on the frequency resources using a modulation order, coding scheme, coding rate, or MCS different from the nominal modulation order, coding scheme, coding rate, or MCS based on the at least one characteristic of how a channel is to be scheduled on the frequency resources.

Aspect 6: The method of any of aspects 1-4, wherein the at least one characteristic comprises one of a number of scheduling options, the scheduling options being: using a lower order modulation order, more reliable coding scheme, lower coding rate or combination thereof for at least a subset of frequency resources of the frequency resources than other frequency resources in a scheduling assignment; use a more reliable modulation and coding scheme (MCS) for frequency resources of the impacted frequency resources than other frequency resources in a scheduling assignment; or at least a subset of frequency resources of the frequency resources are not used for communication.

Aspect 7: The method of aspect 6, wherein for frequency resources other than the frequency resources, least significant bits of modulation symbols to be modulated on the frequency resources are encoded using a more reliable coding scheme than most significant bits of the modulation symbols, wherein the more reliable coding scheme for the frequency resources comprises using a coding scheme that is at least as reliable as the coding scheme used for the least significant bits.

Aspect 8: The method of aspect 6, wherein the at least a subset of frequency resources of the frequency resources comprise a plurality of subsets of the frequency resources and each of the plurality of subsets uses one of the scheduling options.

Aspect 9: The method of aspect 8, wherein the signaling indicating at least one characteristic of how the channel is to be scheduled on the frequency resources indicates the plurality of subsets of the frequency resources and the corresponding scheduling options.

Aspect 10: The method of any of aspects 1-9, wherein the signaling indicating at least one characteristic of how the channel is to be scheduled on the frequency resources indicates time resources in which the at least one characteristic is to be used.

Aspect 11: The method of aspect 10, wherein the at least one characteristic comprises a scheduling option that at least a subset of frequency resources of the frequency resources are not used for communication and the time resources are a subset of slots in a scheduling assignment.

Aspect 12: The method of any of aspects 1-11, wherein the signaling indicating at least one characteristic of how the channel is to be scheduled on the frequency resources comprises: radio resource control (RRC) signaling defining one or more rules relating a modulation order, coding scheme, coding rate, modulation and coding scheme (MCS) or decision not to use specific frequency resources for at least a subset of the frequency resources to a nominal modulation order, coding scheme, coding rate or MCS of a scheduling assignment; downlink control information (DCI) of a scheduling grant.

Aspect 13: The method of any of aspects 1-12, wherein the frequency resources are impacted by a radio frequency impairment or a spur.

Aspect 14: The method of aspect 13, further comprising transmitting assistance information or a capability report indicating a spur cancelation capability or request of the scheduled entity.

Aspect 15: The method of aspect 14, wherein the spur cancellation capability or request comprises a mapping between nominal modulation orders, coding schemes, coding rates, or modulation and coding scheme (MCS) of a scheduling assignment and respective modulation orders, coding scheme, coding rate, MCS or decision not to use specific frequency resources.

Aspect 16: The method of any of aspects 1-15, wherein the frequency resources carry reference signals and the at least one characteristic comprises: shifting a reference signal pattern by a number of subcarriers within a resource block (RB) so that resource elements of the reference signals do not overlap with the frequency resources; an adjusted reference signal pattern different from a nominal reference signal pattern of a scheduling assignment, wherein resource elements of the adjusted reference signal pattern do not overlap with the frequency resources; or not using resource elements of the reference signals for channel estimation.

Aspect 17: The method of aspect 16, wherein when the number of resource elements of the reference signals that are not used for channel estimation is greater than a threshold, a RB or group of RBs comprising the resource elements of the reference signals is not used for data transmission.

Aspect 18: A method of wireless communication performed by a scheduling entity, the method comprising: receiving, from a scheduled entity, an indication of frequency resources that have different transmission requirements from those of other frequency resources in a smallest frequency domain scheduling unit comprising the frequency resources at the scheduled entity; determining, based on the indication, at least one characteristic of how a channel is to be scheduled on the frequency resources; transmitting, to the scheduled entity, signaling indicating the at least one characteristic; and communicating with the scheduling entity in accordance with the at least one characteristic.

Aspect 19: The method of aspect 18, wherein the smallest frequency domain scheduling unit is a resource block (RB) and the frequency resources are indicated at a subcarrier or other sub-RB level of granularity.

Aspect 20: The method of aspect 19, wherein the indication of frequency resources comprises an indication of frequency resources per a bandwidth part (BWP), a component carrier (CC), a band or a transmission direction between the scheduled entity and the scheduling entity.

Aspect 21: The method of any one of aspects 18-20, wherein the at least one characteristic comprises one of a number of scheduling options, the scheduling options being: using a lower order modulation order, more reliable coding scheme, lower coding rate or combination thereof for frequency resources of the impacted frequency resources than other frequency resources in a scheduling assignment; use a more reliable modulation and coding scheme (MCS) for frequency resources of the impacted frequency resources than other frequency resources in a scheduling assignment; or frequency resources of the impacted frequency resources are not used for communication.

Aspect 22: The method of aspect 21, wherein for frequency resources other than the frequency resources, least significant bits of modulation symbols to be modulated on the frequency resources are encoded using a more reliable coding scheme than most significant bits of the modulation symbols, wherein the more reliable coding scheme for the frequency resources comprises using a coding scheme that is at least as reliable as the coding scheme used for the least significant bits.

Aspect 23: The method of aspect 21, wherein the at least a subset of frequency resources of the frequency resources comprise a plurality subsets of the frequency resources and each of the plurality of subsets uses one of the scheduling options.

Aspect 24: The method of aspect 23, wherein the signaling indicating at least one characteristic of how the channel is to be scheduled on the frequency resources indicates the plurality of subsets of the frequency resources and the corresponding scheduling options.

Aspect 25: The method of any of claims 18-24, wherein the signaling indicating at least one characteristic of how the channel is to be scheduled on the frequency resources indicates time resources in which the at least one characteristic is to be used.

Aspect 26: The method of aspect 25, wherein the at least one characteristic comprises a scheduling option that at least a subset of frequency resources of the frequency resources are not used for communication and the time resources are a subset of slots in a scheduling assignment.

Aspect 27: The method of any of aspects 18-26, wherein the signaling indicating at least one characteristic of how a channel is to be scheduled on the frequency resources comprises: radio resource control (RRC) signaling defining one or more rules relating a modulation order, coding scheme, coding rate, modulation and coding scheme (MCS) or decision not to use frequency resources for frequency resources of the frequency resources to a nominal modulation order, coding scheme, coding rate or MCS of a scheduling assignment; downlink control information (DCI) of a scheduling grant.

Aspect 28: The method of any of aspects 18-26, further comprising receiving assistance information indicating a spur cancellation capability of the scheduled entity, wherein the determining at least one characteristic of how the channel is to be scheduled on the frequency resources is based on the spur cancellation capability.

Aspect 29: The method of any of aspects 18-26, wherein the frequency resources carry reference signals and the at least one characteristic comprises; shifting a reference signal pattern by a number of subcarriers within a resource block (RB) so that resource elements of the reference signals do not overlap with the frequency resources; an adjusted reference signal pattern different from a nominal reference signal pattern of a scheduling assignment, wherein resource elements of the adjusted reference signal pattern do not overlap with the frequency resources; or not using resource elements of the reference signals for channel estimation.

Aspect 30: The method of aspect 29, wherein when the number of resource elements of the reference signals that are not used for channel estimation is greater than a threshold, a RB or group of RBs comprising the resource elements of the reference signals is not used for data transmission.

Aspect 31: An apparatus for wireless communication by a scheduled entity, the apparatus comprising: a memory; and at least one processor operatively coupled to the memory, the memory and the one or more processors configured to cause the scheduling entity to: transmit an indication of frequency resources that have different transmission requirements from those of other frequency resources in a smallest frequency domain scheduling unit comprising the frequency resources for the scheduled entity; receive, from a scheduling entity, signaling indicating at least one characteristic of how a channel is to be scheduled on the frequency resources; and communicate with the scheduling entity in accordance with the at least one characteristic.

Aspect 32: The apparatus of aspect 31, wherein: the smallest frequency domain scheduling unit is a resource block (RB) and the frequency resources are indicated at a subcarrier or other sub-RB level of granularity; and the indication of frequency resources comprises an indication of frequency resources per a bandwidth part (BWP), a component carrier (CC), a band or a transmission direction between the scheduled entity and the scheduling entity.

Aspect 33: The apparatus of aspect 31 or 32, wherein the memory and the one or more processors configured to cause the scheduling entity to transmit the indication of frequency resources: during an initial access operation to a base station, wherein the base station is the scheduling entity; as part of a capability report of the scheduled entity; periodically; or when triggered by an event.

Aspect 34: The apparatus of aspect 33, wherein the event is: receiving a request from the scheduling entity to indicate frequency resources that have different transmission requirements from those of other frequency resources in a smallest frequency domain scheduling unit comprising the frequency resources; detecting, by the scheduled entity, that at least one location of subcarriers that have different transmission requirements from those of other frequency resources in a smallest frequency domain scheduling unit comprising the frequency resources has changed; a change in an operating frequency for communication between the scheduling entity and scheduled entity; addition or removal of a cell in carrier aggregation or dual connectivity; or a change in communication direction between the scheduling entity and scheduled entity.

Aspect 35: The apparatus of any of aspects 31-34, wherein the memory and the one or more processors configured to cause the scheduling entity to: receive a scheduling assignment for resources including the frequency resources, wherein the scheduling assignment indicates a nominal modulation order, coding scheme, coding rate, or modulation and coding scheme (MCS); and communicate on the frequency resources using a modulation order, coding scheme, coding rate, or MCS different from the nominal modulation order, coding scheme, coding rate, or MCS based on the at least one characteristic of how a channel is to be scheduled on the frequency resources.

Aspect 36: The apparatus of any of aspects 31-34, wherein the at least one characteristic comprises one of a number of scheduling options, the scheduling options being: using a lower order modulation order, more reliable coding scheme, lower coding rate or combination thereof for at least a subset of frequency resources of the frequency resources than other frequency resources in a scheduling assignment; use a more reliable modulation and coding scheme (MCS) for frequency resources of the impacted frequency resources than other frequency resources in a scheduling assignment; or at least a subset of frequency resources of the frequency resources are not used for communication.

Aspect 37: The apparatus of aspect 36, wherein for frequency resources other than the frequency resources, least significant bits of modulation symbols to be modulated on the frequency resources are encoded using a more reliable coding scheme than most significant bits of the modulation symbols, wherein the more reliable coding scheme for the frequency resources comprises using a coding scheme that is at least as reliable as the coding scheme used for the least significant bits.

Aspect 38: The apparatus of aspect 36, wherein the at least a subset of frequency resources of the frequency resources comprise a plurality of subsets of the frequency resources and each of the plurality of subsets uses one of the scheduling options.

Aspect 39: The apparatus of aspect 38, wherein the signaling indicating at least one characteristic of how the channel is to be scheduled on the frequency resources indicates the plurality of subsets of the frequency resources and the corresponding scheduling options.

Aspect 40: The apparatus of any of aspects 31-39, wherein the signaling indicating at least one characteristic of how the channel is to be scheduled on the frequency resources indicates time resources in which the at least one characteristic is to be used.

Aspect 41: The method of aspect 40, wherein the at least one characteristic comprises a scheduling option that at least a subset of frequency resources of the frequency resources are not used for communication and the time resources are a subset of slots in a scheduling assignment.

Aspect 42: The method of any of aspects 31-41, wherein the signaling indicating at least one characteristic of how the channel is to be scheduled on the frequency resources comprises: radio resource control (RRC) signaling defining one or more rules relating a modulation order, coding scheme, coding rate, modulation and coding scheme (MCS) or decision not to use specific frequency resources for at least a subset of the frequency resources to a nominal modulation order, coding scheme, coding rate or MCS of a scheduling assignment; downlink control information (DCI) of a scheduling grant.

Aspect 43: The apparatus of any of aspects 31-42, wherein the frequency resources are impacted by a radio frequency impairment or a spur.

Aspect 44: The apparatus of aspect 43, wherein the memory and the one or more processors configured to cause the scheduling entity to transmit assistance information or a capability report indicating a spur cancelation capability or request of the scheduled entity.

Aspect 45: The apparatus of aspect 44, wherein the spur cancellation capability or request comprises a mapping between nominal modulation orders, coding schemes, coding rates, or modulation and coding scheme (MCS) of a scheduling assignment and respective modulation orders, coding scheme, coding rate, MCS or decision not to use specific frequency resources.

Aspect 46: The apparatus of any of aspects 31-45, wherein the frequency resources carry reference signals and the at least one characteristic comprises: shifting a reference signal pattern by a number of subcarriers within a resource block (RB) so that resource elements of the reference signals do not overlap with the frequency resources; an adjusted reference signal pattern different from a nominal reference signal pattern of a scheduling assignment, wherein resource elements of the adjusted reference signal pattern do not overlap with the frequency resources; or not using resource elements of the reference signals for channel estimation.

Aspect 47: The apparatus of aspect 46, wherein when the number of resource elements of the reference signals that are not used for channel estimation is greater than a threshold, a RB or group of RBs comprising the resource elements of the reference signals is not used for data transmission.

Aspect 48: An apparatus for wireless communication by a scheduling entity, the apparatus comprising: a memory; and at least one processor operatively coupled to the memory, the memory and the one or more processors configured to cause the scheduling entity to: receive, from a scheduled entity, an indication of frequency resources that have different transmission requirements from those of other frequency resources in a smallest frequency domain scheduling unit comprising the frequency resources the scheduled entity; determine, based on the indication, at least one characteristic of how a channel is to be scheduled on the frequency resources; transmit, to the scheduled entity, signaling indicating the at least one characteristic; and communicate with the scheduling entity in accordance with the at least one characteristic.

Aspect 49: The apparatus of aspect 48, wherein the smallest frequency domain scheduling unit is a resource block (RB) and the frequency resources are indicated at a subcarrier or other sub-RB level of granularity.

Aspect 50: The apparatus of aspect 49, wherein the indication of frequency resources comprises an indication of frequency resources per a bandwidth part (BWP), a component carrier (CC), a band or a transmission direction between the scheduled entity and the scheduling entity.

Aspect 51: The apparatus of any one of aspects 48-50, wherein the at least one characteristic comprises one of a number of scheduling options, the scheduling options being: using a lower order modulation order, more reliable coding scheme, lower coding rate or combination thereof for frequency resources of the impacted frequency resources than other frequency resources in a scheduling assignment; use a more reliable modulation and coding scheme (MCS) for frequency resources of the impacted frequency resources than other frequency resources in a scheduling assignment; or frequency resources of the impacted frequency resources are not used for communication.

Aspect 52: The apparatus of aspect 51, wherein for frequency resources other than the frequency resources, least significant bits of modulation symbols to be modulated on the frequency resources are encoded using a more reliable coding scheme than most significant bits of the modulation symbols, wherein the more reliable coding scheme for the frequency resources comprises using a coding scheme that is at least as reliable as the coding scheme used for the least significant bits.

Aspect 53: The apparatus of aspect 51, wherein the at least a subset of frequency resources of the frequency resources comprise a plurality of subsets of the frequency resources and each of the plurality of subsets uses one of the scheduling options.

Aspect 54: The apparatus of aspect 53, wherein the signaling indicating at least one characteristic of how the channel is to be scheduled on the frequency resources indicates the plurality of subsets of the frequency resources and the corresponding scheduling options.

Aspect 55: The method of any of aspects 48-54, wherein the signaling indicating at least one characteristic of how the channel is to be scheduled on the frequency resources indicates time resources in which the at least one characteristic is to be used.

Aspect 56: The apparatus of aspect 55, wherein the at least one characteristic comprises a scheduling option that at least a subset of frequency resources of the frequency resources are not used for communication and the time resources are a subset of slots in a scheduling assignment.

Aspect 57: The apparatus of any of aspects 48-56, wherein the signaling indicating at least one characteristic of how a channel is to be scheduled on the frequency resources comprises: radio resource control (RRC) signaling defining one or more rules relating a modulation order, coding scheme, coding rate, modulation and coding scheme (MCS) or decision not to use frequency resources for frequency resources of the frequency resources to a nominal modulation order, coding scheme, coding rate or MCS of a scheduling assignment; downlink control information (DCI) of a scheduling grant.

Aspect 58: The method of any of aspects 48-56, wherein the memory and the one or more processors configured to cause the scheduling entity to receive assistance information indicating a spur cancellation capability of the scheduled entity, wherein the determining at least one characteristic of how the channel is to be scheduled on the frequency resources is based on the spur cancellation capability.

Aspect 59: The apparatus of any of aspects 48-56, wherein the frequency resources carry reference signals and the at least one characteristic comprises; shifting a reference signal pattern by a number of subcarriers within a resource block (RB) so that resource elements of the reference signals do not overlap with the frequency resources; an adjusted reference signal pattern different from a nominal reference signal pattern of a scheduling assignment, wherein resource elements of the adjusted reference signal pattern do not overlap with the frequency resources; or not using resource elements of the reference signals for channel estimation.

Aspect 60: The apparatus of aspect 59, wherein when the number of resource elements of the reference signals that are not used for channel estimation is greater than a threshold, a RB or group of RBs comprising the resource elements of the reference signals is not used for data transmission.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method of wireless communication performed by a scheduled entity, the method comprising:

transmitting an indication of at least some frequency resources of available frequency resources are impacted by at least one spur, wherein for at least some available frequency resources other than the at least some frequency resources impacted by the at least one spur, least significant bits of modulation symbols to be modulated on the some available frequency resources are encoded using a more reliable coding scheme than most significant bits of the modulation symbols, wherein the more reliable coding scheme for the some available frequency resources comprises using a coding scheme that is at least as reliable as the coding scheme used for the least significant bits;

receiving, from a scheduling entity, signaling indicating at least one characteristic of how a channel is to be scheduled on the available frequency resources, the at least one characteristic comprising at least one of:

a modulation order based on the indication of the at least some frequency resources impacted by the at least one spur;

a coding scheme based on the indication of the at least some frequency resources impacted by the at least one spur;

a coding rate based on the indication of the at least some frequency resources impacted by the at least one spur; or a modulation and coding scheme (MCS) based on the indication of the at least some frequency resources impacted by the at least one spur; and communicating with the scheduling entity in accordance with the at least one characteristic.

2. The method of claim 1, wherein the indication of the at least some frequency resources impacted by the at least one spur comprises an indication of frequency resources per a bandwidth part (BWP), a component carrier (CC), a band or a transmission direction between the scheduled entity and the scheduling entity.

3. The method of claim 1, wherein the indication of the at least some frequency resources that are impacted by the at least one spur is transmitted:

during an initial access operation to a base station, wherein the base station is the scheduling entity;

as part of a capability report of the scheduled entity;

periodically; or when triggered by an event.

4. The method of claim 3, wherein the event is:

receiving a request from the scheduling entity to identify the frequency resources impacted by the at least one spur;

detecting, by the scheduled entity, the at least one spur;

a change in an operating frequency for communication between the scheduling entity and scheduled entity; and at least one of:

addition or removal of a cell in carrier aggregation or dual connectivity; or a change in communication direction between the scheduling entity and scheduled entity.

5. The method of claim 1, further comprising:

receiving a scheduling assignment for a set of frequency resources, the set of frequency resources comprising the at least some frequency resources that are impacted by the at least one spur, wherein the scheduling assignment indicates at least one of a nominal modulation order, a nominal coding scheme, a nominal coding rate, or a nominal modulation and coding scheme (MCS); and communicating on the frequency resources impacted by the at least one spur using at least one of a second modulation order, a second coding scheme, a second coding rate, or a second MCS that are, respectively, different from the nominal modulation order, the nominal coding scheme, the nominal coding rate, or the nominal MCS based on the at least one characteristic of how the channel is to be scheduled on the frequency resources impacted by the at least one spur.

6. The method of claim 1, further comprising:

receiving, from a scheduling entity, a scheduling assignment;

wherein the modulation order based on the indication of the at least some frequency resources impacted by the at least one spur is for at least the frequency resources impacted by the at least one spur, the modulation order being a lower order than at least one other modulation order, the other modulation order being in the scheduling assignment;

wherein the coding scheme based on the indication of the at least some frequency resources impacted by the at least one spur is for at least the frequency resources impacted by the at least one spur, the coding scheme being more reliable than at least one other modulation coding scheme, the one other modulation scheme being in the scheduling assignment;

wherein the coding rate based on the indication of the at least some frequency resources impacted by the at least one spur is for at least the frequency resources impacted by the at least one spur, the coding rate being lower than at least one other coding rate, the one other coding rate being in the scheduling assignment; and wherein the MCS based on the indication of the at least some frequency resources impacted by the at least one spur is for at least the frequency resources impacted by the at least one spur, the MCS being more reliable than at least one other MCS, the one other MCS being in the scheduling assignment.

7. The method of claim 1, wherein the at least some of the frequency resources that are impacted by the at least one spur comprise a plurality of subsets of the frequency resources and each of the plurality of subsets uses the at least one characteristic.

8. The method of claim 7, wherein the signaling indicating at least one characteristic of how the channel is to be scheduled on the available frequency resources indicates the plurality of subsets of the frequency resources and corresponding scheduling options.

9. The method of claim 1, wherein the signaling indicating at least one characteristic of how the channel is to be scheduled on the available frequency resources indicates time resources in which the at least one characteristic is to be used.

10. The method of claim 9, wherein the at least one characteristic comprises a scheduling option that at least a subset of frequency resources of the available frequency resources are not used for communication and the time resources are a subset of slots in a scheduling assignment.

11. The method of claim 1, wherein the signaling indicating at least one characteristic of how the channel is to be scheduled on the available frequency resources comprises radio resource control (RRC) signaling defining one or more rules relating to the modulation order, the coding scheme, the coding rate, the modulation and coding scheme (MCS) or a decision not to use specific frequency resources for at least a subset of the available frequency resources to a nominal modulation order, coding scheme, coding rate or MCS of a scheduling assignment.

12. The method of claim 1, further comprising transmitting assistance information or a capability report indicating a spur cancelation capability or request of the scheduled entity.

13. The method of claim 12, wherein the spur cancellation capability or request comprises a mapping between a scheduling assignment and at least one of the modulation order, the coding scheme, the coding rate, or the MCS.

14. The method of claim 1, wherein the available frequency resources carry reference signals and the at least one characteristic comprises:

shifting a reference signal pattern by a number of subcarriers within a resource block (RB) so that resource elements of the reference signals do not overlap with the available frequency resources;

an adjusted reference signal pattern different from a nominal reference signal pattern of a scheduling assignment, wherein resource elements of the adjusted reference signal pattern do not overlap with the available frequency resources; or not using resource elements of the reference signals for channel estimation.

15. The method of claim 14, wherein when the number of resource elements of the reference signals that are not used for channel estimation is greater than a threshold, a RB or group of RBs comprising the resource elements of the reference signals is not used for data transmission.

16. The method of claim 1, wherein the at least some frequency resources impacted by the at least one spur comprise a plurality of subsets of the frequency resources and each of the plurality of subsets of the frequency resources uses the at least one characteristic.

17. The method of claim 16, wherein the signaling indicating at least one characteristic of how the channel is to be scheduled on the available frequency resources indicates the plurality of subsets of the frequency resources and corresponding scheduling options.

18. A method of wireless communication performed by a scheduling entity, the method comprising:

receiving, from a scheduled entity, an indication of at least some frequency resources of available frequency resources impacted by at least one spur, wherein for at least some available frequency resources other than the at least some frequency resources impacted by the at least one spur, least significant bits of modulation symbols to be modulated on the some available frequency resources are encoded using a more reliable coding scheme than most significant bits of the modulation symbols, wherein the more reliable coding scheme for the some available frequency resources comprises using a coding scheme that is at least as reliable as the coding scheme used for the least significant bits;

determining, based on the indication, at least one characteristic of how a channel is to be scheduled on the available frequency resources, the at least one characteristic comprising at least one of:

a modulation order based on the indication of the at least some frequency resources impacted by the at least one spur;

a coding scheme based on the indication of the at least some frequency resources impacted by the at least one spur;

a coding rate based on the indication of the at least some frequency resources impacted by the at least one spur; or a modulation and coding scheme (MCS) based on the indication of the at least some frequency resources impacted by the at least one spur;

transmitting, to the scheduled entity, signaling indicating the at least one characteristic; and communicating with the scheduling entity in accordance with the at least one characteristic.

19. The method of claim 18, wherein the indication is transmitted in a smallest frequency domain scheduling unit, the smallest frequency domain scheduling unit is a resource block (RB), and the available frequency resources are indicated at a subcarrier or other sub-RB level of granularity.

20. The method of claim 18, wherein the indication of the at least some frequency resources impacted by the at least one spur comprises an indication of frequency resources per a bandwidth part (BWP), a component carrier (CC), a band or a transmission direction between the scheduled entity and the scheduling entity.

21. The method of claim 18, further comprising:

transmitting, to a scheduled entity, a scheduling assignment;

the modulation order based on the indication of the at least some frequency resources impacted by the at least one spur is for at least the some frequency resources impacted by the at least one spur, the modulation order being a lower order than at least one other modulation order, the other modulation order being in the scheduling assignment;

the coding scheme based on the indication of the at least some frequency resources impacted by the at least one spur is for at least the frequency resources impacted by the at least one spur, the coding scheme being more reliable than at least one other modulation coding scheme, the one other modulation scheme being in the scheduling assignment;

the coding rate based on the indication of the at least some frequency resources impacted by the at least one spur is for at least the frequency resources impacted by the at least one spur, the coding rate being lower than at least one other coding rate, the one other coding rate being in the scheduling assignment; and the MCS based on the indication of the at least some frequency resources impacted by the at least one spur is for at least the frequency resources impacted by the at least one spur, the MCS being more reliable than at least one other MCS, the one other MCS being in the scheduling assignment.

22. The method of claim 18, wherein the signaling indicating at least one characteristic of how the channel is to be scheduled on the available frequency resources indicates time resources in which the at least one characteristic is to be used.

23. The method of claim 22, wherein the at least one characteristic comprises a scheduling option that at least a subset of frequency resources of the available frequency resources are not used for communication and the time resources are a subset of slots in a scheduling assignment.

24. The method of claim 18, wherein the signaling indicating at least one characteristic of how a channel is to be scheduled on the available frequency resources comprises radio resource control (RRC) signaling defining one or more rules relating to the modulation order, the coding scheme, the coding rate, the modulation and coding scheme (MCS) or a decision not to use specific frequency resources for frequency resources of the available frequency resources to a nominal modulation order, coding scheme, coding rate or MCS of a scheduling assignment.

25. The method of claim 18, further comprising receiving assistance information indicating a spur cancellation capability of the scheduled entity, wherein the determining at least one characteristic of how the channel is to be scheduled on the available frequency resources is based on the spur cancellation capability.

26. The method of claim 18, wherein the available frequency resources carry reference signals and the at least one characteristic comprises:

shifting a reference signal pattern by a number of subcarriers within a resource block (RB) so that resource elements of the reference signals do not overlap with the available frequency resources;

an adjusted reference signal pattern different from a nominal reference signal pattern of a scheduling assignment, wherein resource elements of the adjusted reference signal pattern do not overlap with the available frequency resources; or not using resource elements of the reference signals for channel estimation.

27. The method of claim 26, wherein when the number of resource elements of the reference signals that are not used for channel estimation is greater than a threshold, a RB or group of RBs comprising the resource elements of the reference signals is not used for data transmission.

28. An apparatus for wireless communication by a scheduled entity, the apparatus comprising:

a memory; and at least one processor operatively coupled to the memory, the memory and the one or more processors configured to cause the scheduled entity to:

transmit an indication of at least some resources of available frequency resources impacted by at least one spur, wherein for at least some available frequency resources other than the at least some frequency resources impacted by the at least one spur, least significant bits of modulation symbols to be modulated on the some available frequency resources are encoded using a more reliable coding scheme than most significant bits of the modulation symbols, wherein the more reliable coding scheme for the some available frequency resources comprises using a coding scheme that is at least as reliable as the coding scheme used for the least significant bits;

receive, from a scheduling entity, signaling indicating at least one characteristic of how a channel is to be scheduled on the available frequency resources, the at least one characteristic comprising at least one of:

a modulation order based on the indication of the at least some frequency resources impacted by the at least one spur;

a coding scheme based on the indication of the at least some frequency resources impacted by the at least one spur;

a coding rate based on the indication of the at least some frequency resources impacted by the at least one spur; or a modulation and coding scheme (MCS) based on the indication of the at least some frequency resources impacted by the at least one spur; and communicate with the scheduling entity in accordance with the at least one characteristic.

29. An apparatus for wireless communication by a scheduling entity, the apparatus comprising:

a memory; and at least one processor operatively coupled to the memory, the memory and the one or more processors configured to cause the scheduling entity to:

receive, from a scheduled entity, an indication of at least some resources of available frequency resources impacted by at least one spur, wherein for at least some available frequency resources other than the at least some frequency resources impacted by the at least one spur, least significant bits of modulation symbols to be modulated on the some available frequency resources are encoded using a more reliable coding scheme than most significant bits of the modulation symbols, wherein the more reliable coding scheme for the some available frequency resources comprises using a coding scheme that is at least as reliable as the coding scheme used for the least significant bits;

determine, based on the indication, at least one characteristic of how a channel is to be scheduled on the available frequency resources, the at least one characteristic comprising at least one of:

a modulation order based on the indication of the at least some frequency resources impacted by the at least one spur;

a coding scheme based on the indication of the at least some frequency resources impacted by the at least one spur;

a coding rate based on the indication of the at least some frequency resources impacted by the at least one spur; or a modulation and coding scheme (MCS) based on the indication of the at least some frequency resources impacted by the at least one spur;

transmit, to the scheduled entity, signaling indicating the at least one characteristic; and communicate with the scheduling entity in accordance with the at least one characteristic.

30. The apparatus of claim 28, wherein the indication of the at least some frequency resources impacted by the at least one spur comprises an indication of frequency resources per a bandwidth part (BWP), a component carrier (CC), a band or a transmission direction between the scheduled entity and the scheduling entity.

31. The apparatus of claim 29, wherein the indication of the at least some frequency resources impacted by the at least one spur comprises an indication of frequency resources per a bandwidth part (BWP), a component carrier (CC), a band or a transmission direction between the scheduled entity and the scheduling entity.

* * * * *